United States Patent
Touchton et al.

(10) Patent No.: US 9,526,229 B2
(45) Date of Patent: Dec. 27, 2016

(54) ANIMAL TRAINING SYSTEM AND METHOD

(75) Inventors: Scott F. Touchton, Pottstown, PA (US); James T. Deery, Spring City, PA (US); Blaine Bacher, West Chester, OH (US)

(73) Assignee: PERIMETER TECHNOLOGIES, INC., Reading, PA (US)

( * ) Notice: Subject to any disclaimer, the term of this patent is extended or adjusted under 35 U.S.C. 154(b) by 1123 days.

(21) Appl. No.: 12/957,024

(22) Filed: Nov. 30, 2010

(65) Prior Publication Data

US 2012/0132151 A1   May 31, 2012

(51) Int. Cl.
  *A01K 15/02*   (2006.01)
(52) U.S. Cl.
  CPC .................. *A01K 15/021* (2013.01)
(58) Field of Classification Search
  CPC .................................. A01K 15/021
  USPC ............... 119/718, 719, 720, 721; 340/573.3
  See application file for complete search history.

(56) References Cited

U.S. PATENT DOCUMENTS

| | | | | |
|---|---|---|---|---|
| 4,335,682 A * | 6/1982 | Gonda et al. | | 119/719 |
| 5,046,453 A * | 9/1991 | Vinci | | 119/718 |
| 5,067,441 A | 11/1991 | Weinstein | | |
| 5,241,923 A | 9/1993 | Janning | | |
| 5,381,129 A | 1/1995 | Boardman | | |
| 5,425,330 A | 6/1995 | Touchton et al. | | |
| 5,460,124 A | 10/1995 | Grimsley et al. | | |
| 5,632,232 A * | 5/1997 | Waters | | 119/720 |
| 5,682,839 A | 11/1997 | Grimsley et al. | | |
| 5,844,489 A | 12/1998 | Yarnall, Jr. | | |
| 5,852,403 A | 12/1998 | Boardman | | |
| 6,019,066 A | 2/2000 | Taylor | | |
| 6,047,664 A * | 4/2000 | Lyerly | | 119/719 |
| 6,079,367 A * | 6/2000 | Stapelfeld et al. | | 119/720 |
| 6,269,776 B1 | 8/2001 | Grimsley et al. | | |
| 6,415,742 B1 * | 7/2002 | Lee et al. | | 119/721 |
| 6,575,120 B1 | 6/2003 | Stapelfeld et al. | | |
| 6,588,376 B1 * | 7/2003 | Groh | | 119/860 |
| 6,598,563 B2 | 7/2003 | Kim et al. | | |
| 6,604,490 B1 * | 8/2003 | Lee et al. | | 119/712 |
| 6,668,760 B2 * | 12/2003 | Groh et al. | | 119/718 |
| 6,825,768 B2 | 11/2004 | Stapelfeld et al. | | |
| 6,860,240 B2 | 3/2005 | Kim et al. | | |
| 7,377,234 B2 * | 5/2008 | Belcher | | 119/720 |
| 7,709,136 B2 | 5/2010 | Touchton | | |
| 2002/0127946 A1 * | 9/2002 | Hornsby et al. | | 446/176 |
| 2003/0218539 A1 | 11/2003 | Hight | | |
| 2006/0172697 A1 | 8/2006 | Gallego et al. | | |
| 2008/0252527 A1 | 10/2008 | Garcia | | |

OTHER PUBLICATIONS

Nanotron Technologies GmbH Series of web pages and documents from said web pages containing product information on Nanotron line of RF chips. Dated Dec. 13, 2006.

* cited by examiner

*Primary Examiner* — Justin Benedik
(74) *Attorney, Agent, or Firm* — Donald R. Piper, Jr.; Dann, Dorfman, Herrell and Skillman, P.C.

(57) ABSTRACT

An animal training system includes a portable remote transceiver for a user for transmitting a remote animal control signal to a remote animal transceiver on an animal for effecting a control stimulus to the animal. A separate animal control transceiver positioned at the animal may be in signal communication with the remote animal transceiver placed at the animal to effect a control stimulus to the animal in response to a control signal from the remote animal transceiver.

8 Claims, 21 Drawing Sheets

ANIMAL TRAINING SYSTEM AND METHOD

FIELD OF THE INVENTION

The present invention relates to an animal training system and method and, more particularly, to an electronic animal training system and method that provides a control stimulus to an animal.

BACKGROUND OF THE INVENTION

It is often times desirable to control the movement of an animal such as confining the movement of an animal, like a dog, to a particular area such as a person's backyard. Over the years, electronic pet containment systems have been developed that include an electronic dog collar that provides a stimulus, such as an electrical shock, to the animal when the animal moves into a certain proximity of a buried antenna to prevent or deter movement of the animal beyond a selected area such as a backyard. For this purpose, conventional electronic animal confinement systems often use a transmitter connected with an antenna that is buried around the perimeter of a selected area, such as a person's yard. The transmitter produces a control signal, such as an RF signal, that is transmitted through the buried antenna. Whenever an animal, such as a dog, approaches a predetermined distance of the buried antenna, the electronic dog collar receives the control signal and in response applies a stimulus to the dog to deter further movement of the dog toward the buried antenna.

Since it is not practical to move the buried antenna to different locations, such as a park or a field, it would be desirable to have the ability to utilize a portable transmitter that communicates with the electronic dog collar in order to control movement of the dog at a remote location. It would also be desirable to have a system that could control various types of proximity electronic collars.

SUMMARY OF THE INVENTION

In accordance with the present invention, an electronic animal training system and method are provided. An animal training system is provided for use in training an animal such as a dog through the use of a control stimulus, such as electrical shocks, vibrational sensations and audible sounds or alarms. For this purpose, the animal training system includes a portable remote transceiver for a user for transmitting a remote animal control signal. A remote animal transceiver is also provided for placement on or at the animal for receiving the remote animal control signal and for effecting a control stimulus to the animal.

The remote animal transceiver placed at the animal may also be configured to be in signal communication with a separate animal control transceiver, such as a pre-existing animal control transceiver, at the animal to effect a control stimulus to the animal. For example, the remote animal transceiver may be configured to be in signal communication with a separate animal control receiver at the animal to enable the animal control transceiver to provide a control stimulus to the animal. In response to a control signal from the portable user remote transceiver, the remote animal transceiver positioned at the animal may send a control signal to the animal control transceiver at the animal to provide or produce a control stimulus to the animal. Optionally, the remote animal transceiver may, in response to a control signal from the user remote transceiver, effect the control stimulus to the animal by directly providing or producing the control stimulus to the animal.

In an optional embodiment, the control stimulus may include a first control stimulus and a second control stimulus. The remote animal transmitter may be configured to provide the first control stimulus directly to the animal in response to a selected control signal from the user remote transceiver and to provide a communication signal to the animal control transceiver in response to another selected control signal from the user remote transceiver so that the animal control transceiver provides the second control stimulus to the animal. In a specific embodiment, the first stimulus provided by the remote animal transceiver may include at least one or both of an audible alarm or a physical vibrational stimulus to the animal. The second control stimulus supplied to the animal by the animal control transceiver may include at least one of or both of an audible alarm or an electrical shock. The electrical shock may also be selectively supplied at a selected parameter, such a variable parameter, such as time duration or magnitude variation.

Optionally, when the animal control transceiver is in use with an existing home or base transmitter that transmits control signals to the animal control receiver over an existing home or base antenna such as a buried base antenna to administer an animal control stimulus, such as an electrical shock to the animal, the remote user transceiver may include a signal field detector for detecting the control signal transmitted from the base antenna so that the user remote transmitter may effect the storage and/or replication of that control signal in response to user input at the remote user transceiver. In this arrangement, the remote user transceiver would be used to generate or cause the generation of the replicated control signal in response to a user input. In such a arrangement, the remote animal transceiver would function to receive a control signal transmitted by the remote user transceiver and in response send a control signal, which could include the replicated signal, to the animal control transceiver at the animal which in response could deliver a control stimulus to the animal.

Optionally, the user remote transceiver may include selected user inputs so that the user may selectively administer a selected controlled stimulus to the animal. The user inputs may also be selectively used to administer control inputs from either or both of the remote animal transceiver at the animal and/or the animal control transceiver at the animal.

BRIEF DESCRIPTION OF THE DRAWINGS

The foregoing summary and the detailed description of the preferred embodiments of the present invention will be best understood when read in conjunction with the appended drawings.

FIGS. 4A-4F are schematic circuit diagrams of the remote user transceiver shown in FIGS. 1 and 2 in which: FIG. 4A is a schematic circuit diagram of the transceiver chip circuitry and associated antenna circuitry for the remote user transceiver; FIG. 4B is a schematic circuit diagram of the controller circuitry, including programming pin circuitry, the audio circuitry, and the low battery indicator circuitry for the remote user transceiver; FIG. 4C is a schematic circuit diagram for the user input circuitry for dog selection and animal control stimulus application; FIG. 4D is a schematic circuit diagram of the dog selection indicator light circuitry; FIG. 4E is a schematic circuit diagram of the signal field detection circuitry for detecting a signal emitted from the home or base antenna; and FIG. 4F is a schematic circuit diagram of the power supply circuitry, including a user input to turn the device on and off.

FIG. 5A-5F are schematic circuit diagrams of the remote animal transceiver of the animal training system shown in FIGS. 1 and 3, in which: FIG. 5A is a schematic circuit diagram of the activation circuitry for transmitting a communication signal to the animal control transceiver; FIG. 5B is a schematic circuit diagram of the power supply circuitry; FIG. 5C is a schematic circuit diagram of the control stimulus circuitry including a vibrational circuit for generating a physical vibration stimulus and an audio circuit for generating an audible alarm stimulus; FIG. 5D is a schematic circuit diagram of the controller circuitry including programming input pin circuitry; FIG. 5E is a schematic circuit diagram of the transceiver chip circuitry; and FIG. 5F is a schematic circuit diagram of the associated antenna circuitry for the transceiver chip circuitry.

FIG. 6, including

FIG. 7, including

FIG. 8, including

DETAILED DESCRIPTION OF THE INVENTION

Figure 1:
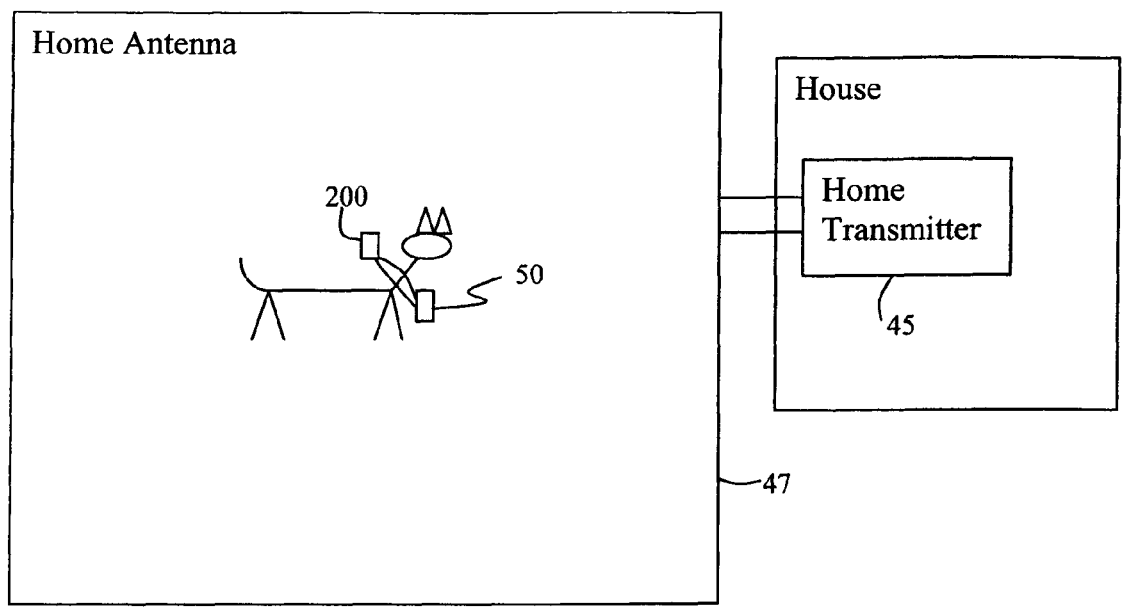
FIG. 1 is a schematic representation of an animal training system in accordance with the present invention.
Figure 1:
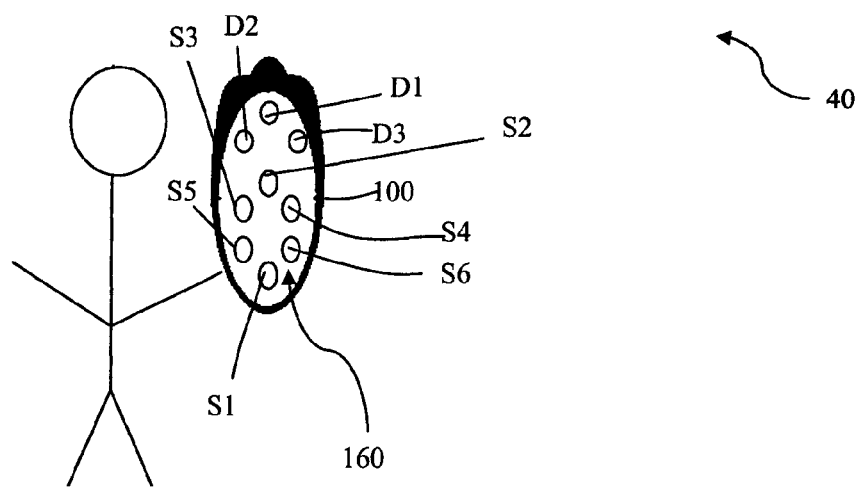

Referring generally to the Figures and initially to FIG. 1, an animal training system, generally designated 40 is provided. The animal training system 40 functions to supply or administer control stimulus to an animal, such as a dog, in order to control the animal behaviour. The animal training system 40 includes a remote user transceiver 100, that may be portable, for transmitting animal control signals, such as radio frequency signals (RF signals), in response to activation of user inputs 160 or automatically, for example, pursuant to a computer-executed program. The animal training system also includes a remote animal transceiver 200 that is carried on an animal, such as a collar of the animal. The remote animal transceiver 200 is responsive to the animal control signals from the remote user transceiver 100 to effect a control stimulus, such as an audible alarm, vibrational alarm, or an electrical shock, to the animal. The animal control system 40 may incorporate or be used with a separate home or base system that includes a home transceiver 45, that may function as a transmitter to transmit a base control signal, such as an RF signal, over a base antenna 47 so that the base control signal may be received by an animal control transceiver 50 carried on the animal to cause the animal control transceiver 50 to produce a control stimulus to the animal in response to the base control signal transmitted by the home transmitter 45. The base transmitter 45 may function as a home transmitter unit and may for example be connected with the base antenna 47, which functions as a home antenna, that may be buried or held in stationary position around the perimeter of an area, such as a yard, in which the animal is to be contained. The base antenna may also be configured to contain the animal within a certain distance outside of the position of the home antenna. The animal control transceiver 50 may be in the form of a collar receiver that functions to communicate with the home transmitter 45 in order to administer a controlled stimulus, such as an audible sound or an electrical shock, to the animal when the animal moves beyond a predefined boundary area or within a predetermined distance of a buried perimeter antenna 47.

As best shown in FIG. 1, the animal training system 40 includes the remote user transceiver 100 that functions to transmit a remote animal control signal such as an RF signal. The remote user transceiver 100 may be in the form of a portable hand-held transmitter unit shown in enlarged form in FIG. 1. The hand-held remote user transceiver 100 is operated by the user and in response to activation of user input 160 may generate predetermined control signals for producing a different control stimulus to the animal or for effecting the production of different control stimulus to the animal. The hand-held remote user transceiver 100 produces remote animal control signals that may be received by a remote animal transceiver 200 that is placed at or on the animal. The remote animal transceiver 200 may be sufficiently light and small in form so as to be carried on the collar of the animal as shown schematically in FIG. 1. The remote animal transceiver 200 is provided for placement at the animal for receiving the remote animal control signal and for effecting the control stimulus to the animal in response to the reception of the animal control signals transmitted from the remote user transceiver 100 typically, although not necessarily, in response to activation of user inputs 160 on the remote user transceiver 100. The remote animal transceiver 200 may also be configured to be in communication, such as RF signal communication, with a separate animal control transceiver such as animal control transceiver 50, likewise provided for placement on the animal and preferably on the collar of the animal as shown schematically in FIG. 1. The remote animal transceiver 200 is configured to be in signal communication with the animal control receiver 50 in order to selectively cause the animal control transceiver to provide the control stimulus to animal.

The remote animal transceiver 200 may be configured so that in response to a selected control signal from the remote user transceiver 100 the remote animal transceiver 200 produces a control stimulus that is administered by the remote animal transceiver 200 to the animal. For example, the user may select to produce a certain control stimulus by depressing one or more of the user input buttons 160 on the remote user transceiver 100. For example, the user inputs 160 may include switches that include a switch S3 for effecting an audible alarm as the control stimulus, switch S4 for effecting a vibrational sensation to the animal as the control stimulus, S5 for effecting an electrical shock to the animal as the control stimulus, and S6 for effecting an electrical shock of a different time duration to the animal. The user input 160 may also include a power on-off switch S1 for turning the unit on and off. When the unit is turned on, an indicator light D1 may be illuminated. The user inputs may also include a switch S2 to program the transceiver 100, for example, with a first dog that may cause indication light D2 to illuminate or with a second dog having another remote animal transceiver causing indication light D3 to illuminate. In response to the activation of selected user input switches 160, or automatically, for example, in response to programming, the hand held remote user transceiver 100 will produce a selected remote animal control signal for transmission to the remote animal transceiver 200 carried by the animal. In response to a selected animal control signal, the remote animal transceiver may produce a control stimulus directly to the animal, such as an audible alarm stimulus or a physical vibrational stimulus to the animal, and/or may also provide a communication signal to the animal control transceiver 50 so that the animal control receiver in response to the communication signal from the remote user transceiver 100 provides a control stimulus to the animal. The remote animal transceiver may also be configured to provide a communication signal to the animal control transceiver in response to a second or another control stimulus signal from the user remote transceiver, for example, in response to the user input of a different input switch 160, so that the animal control transceiver, in response to the communication signal, provides a second control stimulus to the animal. The remote animal transceiver 200 may be configured, for example, to provide an animal control stimulus to the animal that may include at least one or both of an audible alarm or physical vibrational stimulus to the animal. In a specific arrangement, depressing S3 may cause the remote animal transceiver 200 to produce an audible alarm to the animal and depressing S4 may cause the remote animal transceiver 200 to produce a physical vibrational stimulus to the animal. The remote animal transceiver 200 may also be configured to provide a communication signal to the animal control transceiver 50 in response to a user input at the remote user transceiver 100 so that the animal control transceiver 50 may provide an animal control stimulus to the animal that may include at least one of or both of an audible alarm and/or an electrical shock. In a specific arrangement, depressing S5 may cause the remote animal transceiver 200 to transmit a communication signal to the animal control transceiver 50 so that the animal control transceiver 50 produces an electrical shock to the animal whereas depressing S6 may cause the remote animal transceiver 200 to transmit a communication signal to the animal control transceiver 50 so this animal control transceiver produces an electrical shock of a different duration, or an audible alarm or an audible alarm and electrical shock, to the animal. More specifically, the remote animal transceiver 200 may be configured to effect control stimulus to the animal by providing at least one or both of (a) a controlled stimulus to the animal from the remote animal transceiver 200 and (b) a communication signal to the animal control transceiver 50 so that the animal control transceiver 50 provides a control stimulus to the animal.

Figure 2:
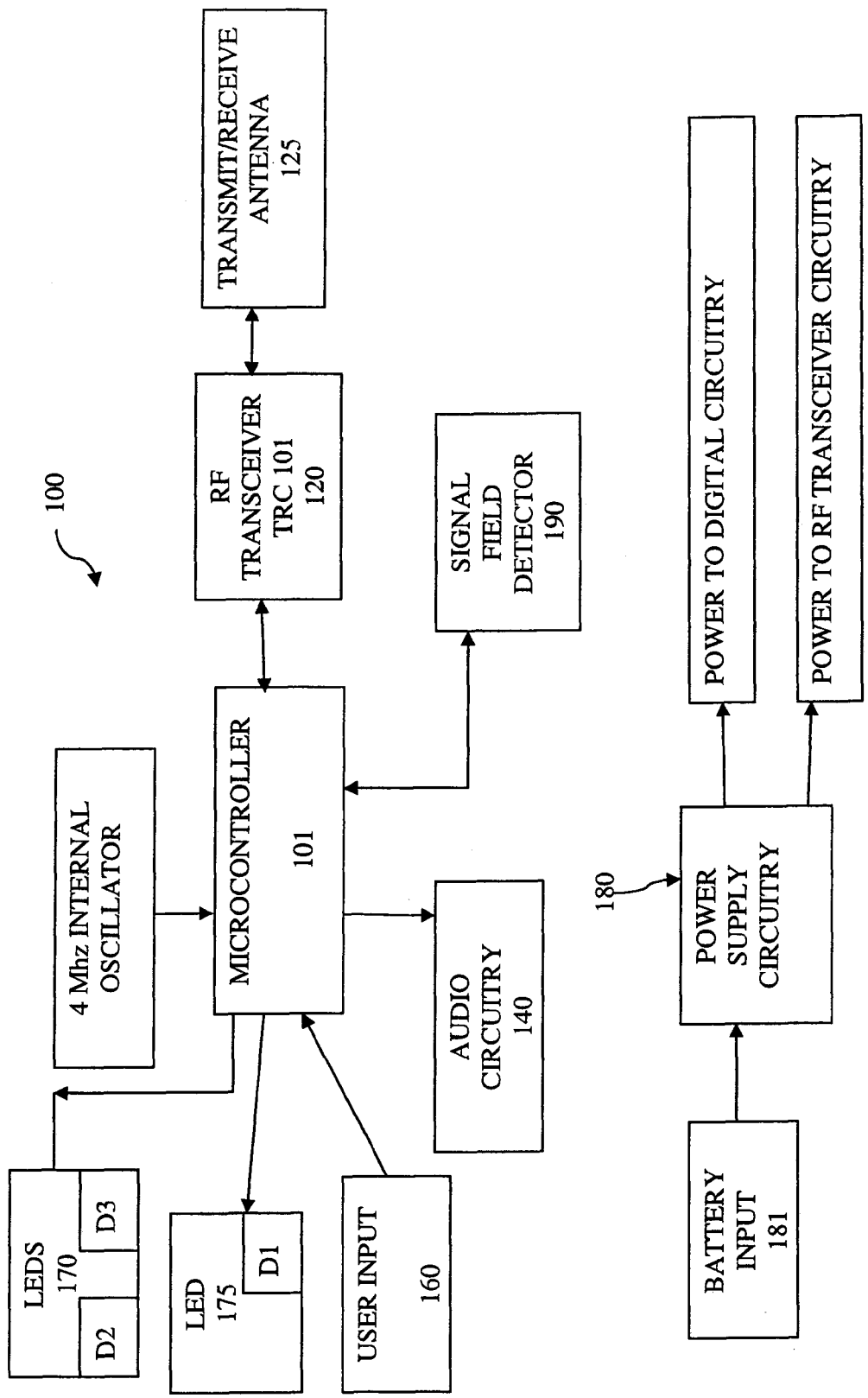
FIG. 2 is a schematic block circuit diagram of a remote user transceiver for use by a user of the animal training system depicted in FIG. 1.

As best shown in FIG. 2, the hand-held remote user transceiver 100 may be a battery powered hand-held device that operates under the control of a controller circuit 101 that functions to control operation of the remote user transceiver 100. The controller circuitry 101 may include a microcontroller having an internal clock (4 Mhz oscillator), internal storage or memory (RAM) and programmable memory (EPROM) for storing program information. In order to effect signal communications, the controller 101 is connected with and controls operation of a signal transceiver circuit 120, such as an RF transceiver chip circuit, that functions to transmit and receive signal transmissions such as RF signal transmissions via an antenna circuit 125. The controller circuit 101 also functions to control an audio circuit 140 to produce audible signals to the user. The remote user transceiver 100 also includes user inputs 160 in the form of input circuitry provided in the form of push buttons S1-S6 and associated circuitry. The hand-held remote user transceiver 100 also includes an output display in the form of an output indicator 170 which, for example, may be provided as LEDs (D2 and D3) to display use of the remote user transmitter, for example, with a first dog (LED D2) or a second dog (LED D3).

The remote user transceiver 100 also includes an output display in the form of an output indicator 175 which, for example, may be an LED (D1) used as a low battery indicator light for the remote user transceiver unit 100. The remote transceiver 100 is powered by a battery 181, that may be rechargeable, that operates with power circuitry 180 that may be switched on and off using one of the input buttons 160 (such as S1) on the hand held remote user transceiver 100. The power circuitry functions to provide power from the battery 181 to supply the desirable power to the digital circuitry of the unit as well as the RF transceiver circuitry.

Optionally, the remote user transceiver 100 may also include signal field detection circuitry 190 that may be configured to operate with the controller circuit 101 to detect the animal control signal transmitted by the home transmitter 45 over the home antenna 47. The remote user transceiver 100 is configured to be moved into proximity of the base antenna 47 thereby activating the field signal detector circuitry 190 to detect the base animal control signal being transmitted from the base antenna 47. The controller circuit 101 functions in conjunction with the signal field detector circuitry 190 to analyze the base animal control signal being transmitted from the base antenna so that a duplicated or replicated signal can be stored under the control of the controller 101. The controller 101 may then provide a communication signal to the remote animal transceiver 200 so that the remote animal transceiver 200 is enabled to produce or reproduce the base animal control signal as a representative base control signal for transmission to the animal control transceiver 50 in response to the remote animal transceiver 200 receiving a selected control signal from the remote user transceiver 100 so that the animal control transceiver 50 provides the desired controlled stimulus such as an audible alarm or an electrical shock to the animal. The signal field detector circuitry 190 may also function under the control of the controller to enable the controller to store or generate a replicated base control signal.

Figure 3:
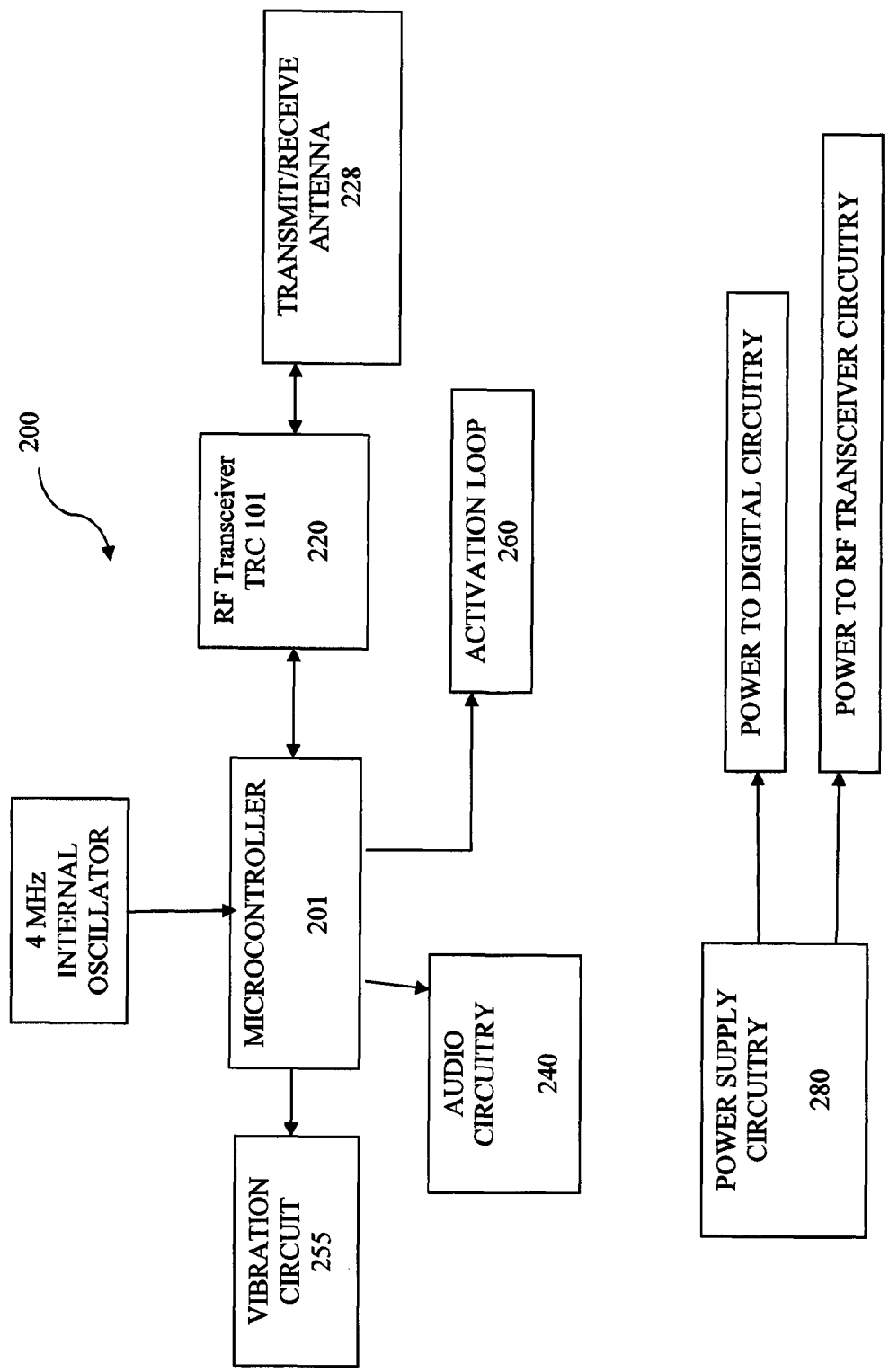
FIG. 3 is a schematic block circuit diagram of a remote animal transceiver of the animal training system depicted in FIG. 1 for use at an animal.

As best shown in FIG. 3, the remote animal transceiver 200 may be a battery powered portable device that is carried on the collar of the animal. The remote animal transceiver 200 operates under the control of a controller circuit 201 that functions to control operation of the remote animal transceiver 200. The controller circuitry 201 may include a microcontroller 205 having an internal clock (4 Mhz oscillator), internal storage memory (RAM) and internal programming memory (EPROM) that function to store and execute programs to control operations. In order to effect signal communications, such as communications with the remote user transceiver 100, the controller 201 is connected with and controls operation of a signal transceiver circuit 220, such as an RF transceiver chip circuit, that functions to transmit and receive signals such as RF signal transmissions via an antenna circuit 228. The controller 201 also functions to control an audio circuit 240 to produce an audible signal, such as a control stimulus, to the animal. The remote animal transceiver 200 also includes a vibrational circuit 255 that functions to provide a physical vibrational stimulus to the animal as an animal control stimulus. The remote animal transceiver 200 is powered by a battery, such as a rechargeable battery, that operates power supply circuitry 280 that functions to provide power from the battery to the digital circuitry of the unit as well as the RF transceiver circuitry of the unit. The remote animal transceiver 200 also may include activation circuitry 260 that functions to provide a communication signal such as an activation signal to the animal control transceiver 50 to cause the animal control transceiver to administer a selected controlled stimulus to an animal. The activation circuitry includes an activation loop or antenna for transmitting the desired communication signals to the animal control transceiver 50 under the control of the controller 201.

Figure 4A:
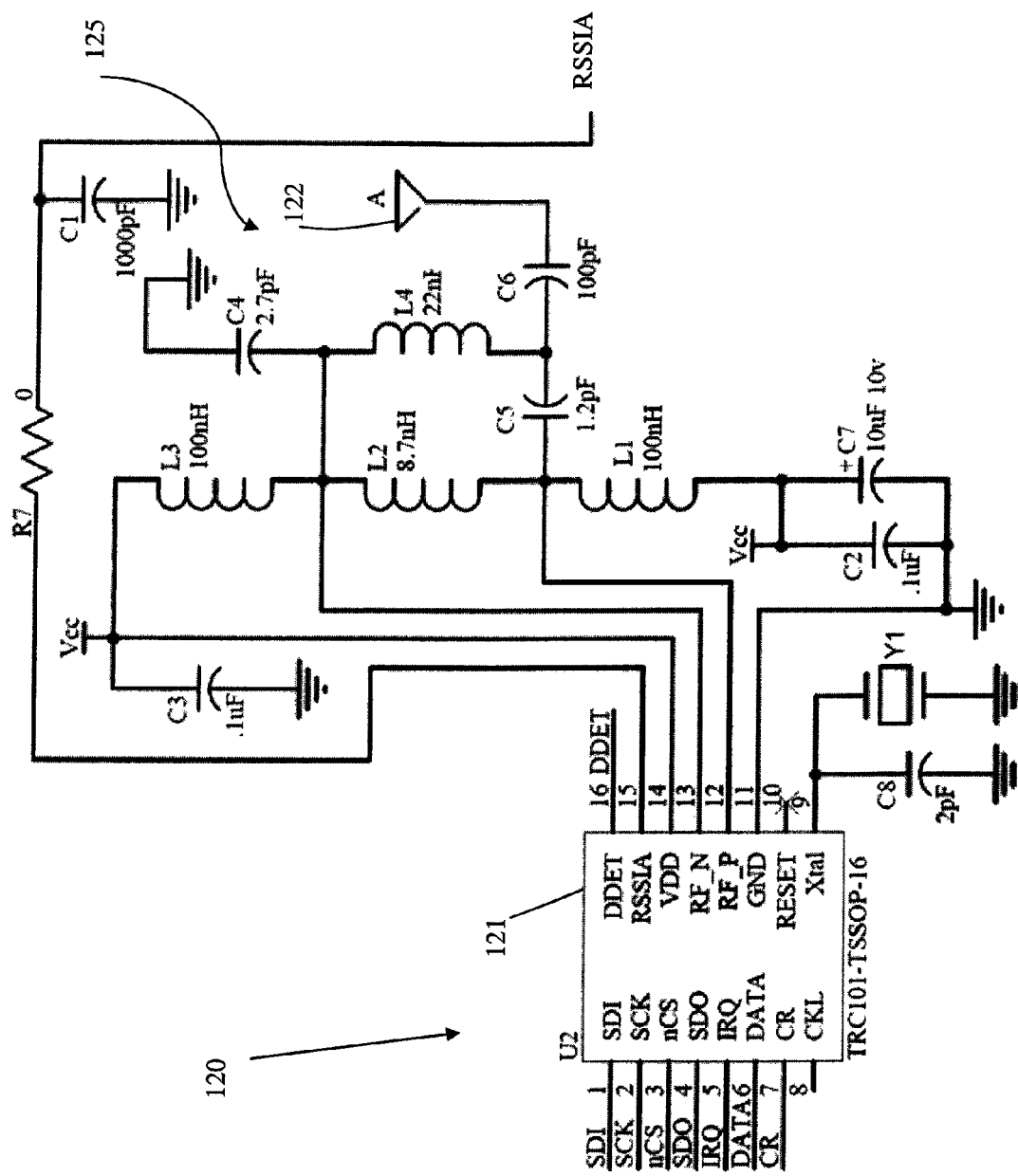

Referring to FIGS. 4A-4F, the circuitry of the remote user transceiver 100 is shown greater detail. With reference to FIG. 4A, the transceiver chip circuitry 120 is depicted. The transceiver chip circuitry 120 includes a transceiver chip U2, generally designated 121, provided in the form of chip TRC101-TSSOP-16, which functions to effect RF signal transmissions and reception over antenna circuitry, generally designated 125. In order to transmit and receive signals such as RF signals, for example, from the remote animal transceiver 200, antenna A, generally designated 122, is connected with the transceiver chip 121, relative to pins 12 and 13 to provide signals RF_N and RF_P between the antenna 122 and the transceiver chip 121. The transceiver chip 121 is connected with the antenna 122 through an impedance matching network including inductors L2 and L4 and capacitors C4 and C5. Capacitor C6 functions as a DC block to prevent the shorting of circuitry if the antenna A is inadvertently grounded. Inductors L1 and L3 serve as RF chokes. Capacitors C2, C3 and C7 serve as filter capacitors. The transceiver chip 121 has pin 1 connected with pin 15 of the controller chip 105 of the controller circuitry 101 shown in FIG. 4B to provide a serial data input line SDI to the controller chip 101. The transceiver chip has pin 2 connected with pin 17 of the controller chip 105 to provide a serial clock SCK line. Pin 3 of the transceiver chip 121 is connected with pin 14 of the controller chip 105 to provide a chip select line nCS. Pin 4 of the transceiver chip 121 is connected with pin 18 of the controller chip 105 to provide a serial data output line SDO from the controller chip 101. Pin 5 of the transceiver chip is connected with pin 13 of the controller chip 101 to provide an interrupt request line IRQ. Pin 6 of the transceiver chip 121 is connected with pin 11 of the controller chip 105 to provide a data line DATA. Pin 7 of the transceiver chip is connected with pin 4 of the controller chip 105 to provide a control reset line CR. Pin 16 of the transceiver chip may be connected with pin 12 of the controller chip 105 to provide a data detection line DDET for purpose of providing as indication of valid data. Pin 15 of the transceiver chip 121 may be connected with pin 2 of the controller chip through resistor R7 to provide a received signal strength line RSSIA. Pin 14 of the transceiver chip is connected to voltage supply VCC from the power supply circuitry 180. Pin 11 of the transceiver chip 121 is connected to ground GND and pin 9 of the transceiver chip is connected with an crystal oscillator provided by oscillator Y1 connected in parallel with capacitor C8 from pin 9 to ground thereby providing a clock or oscillator signal line Xta1.

Figure 4B:
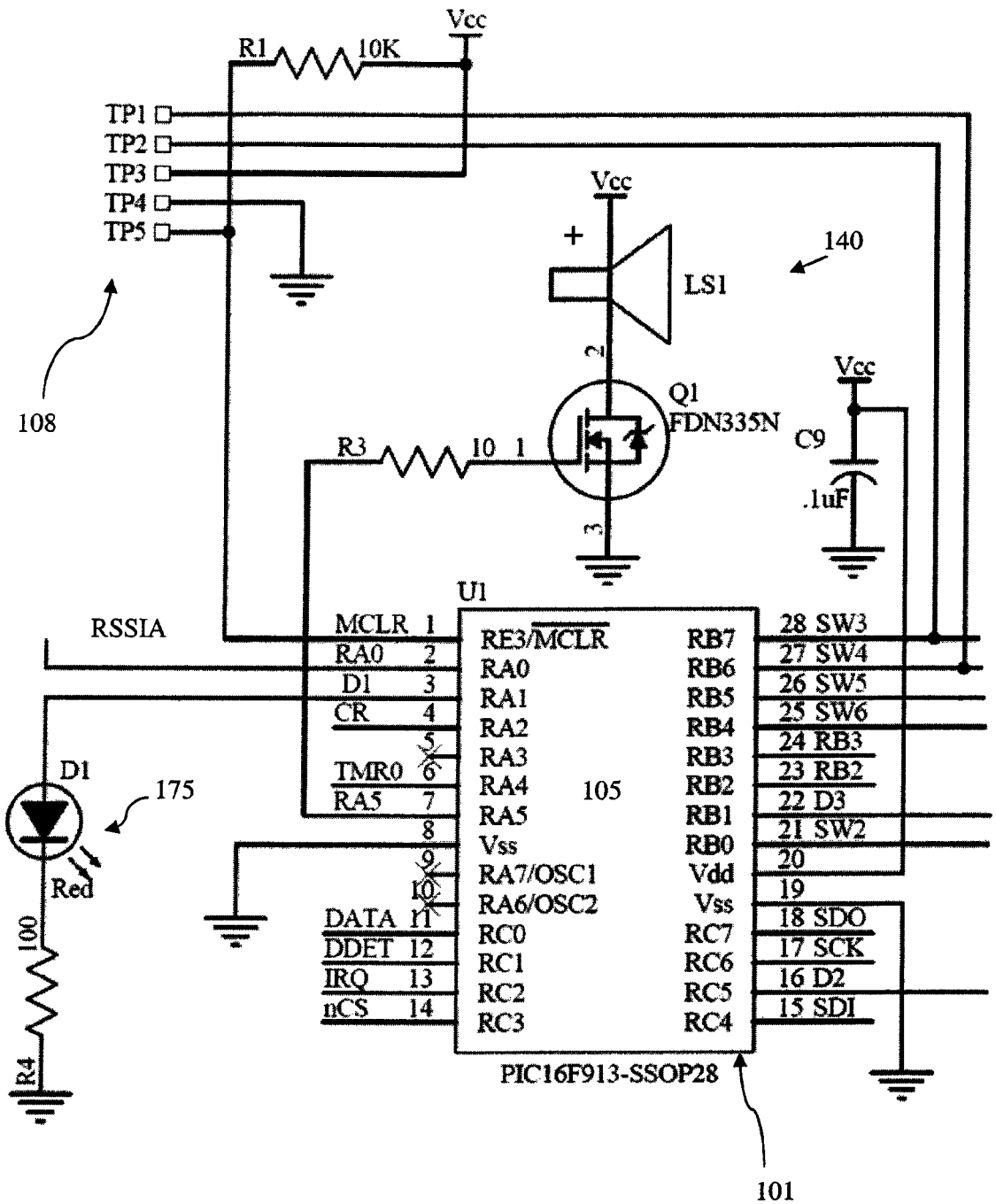
Figure 4C:
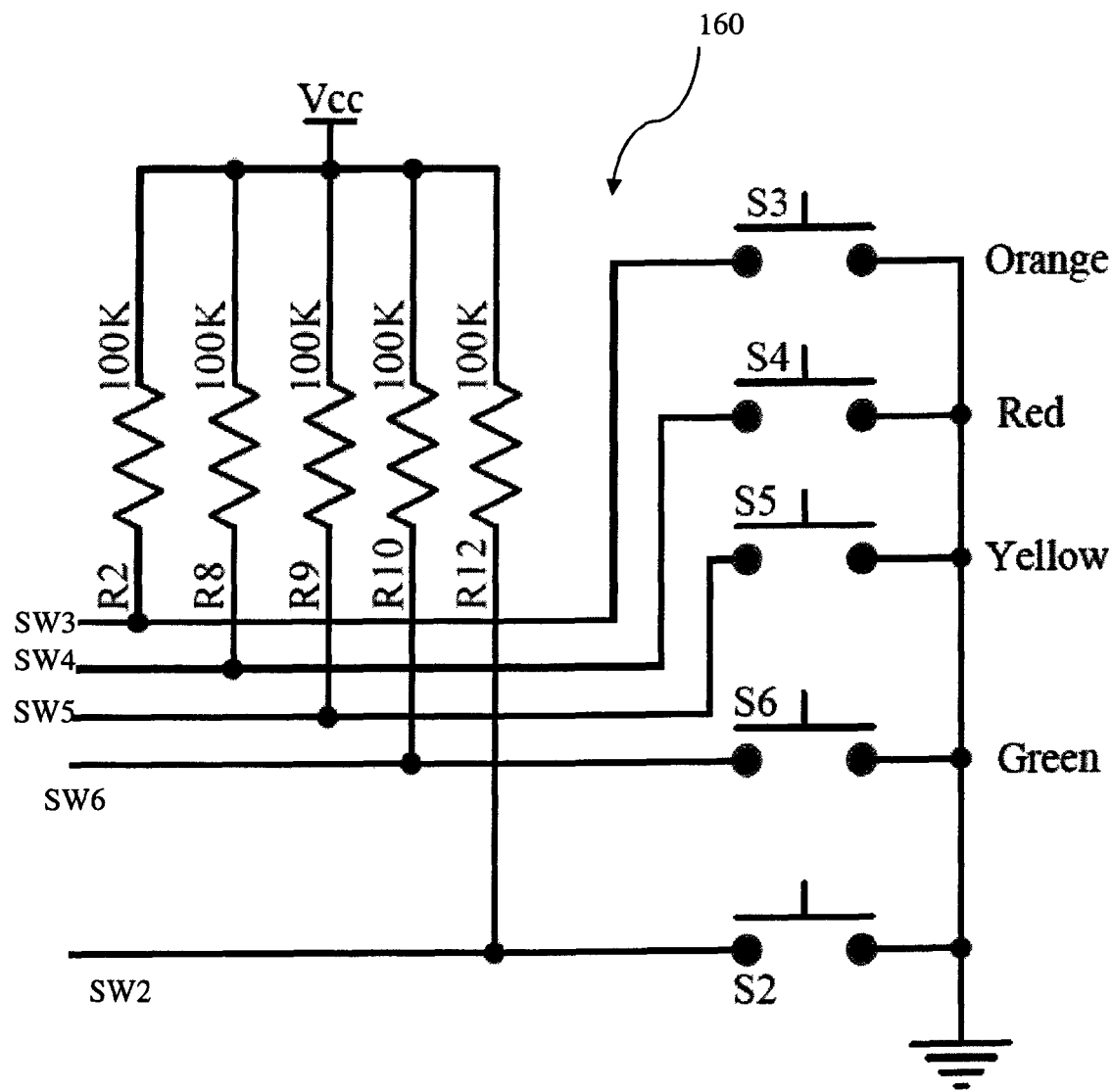
Figure 4D:
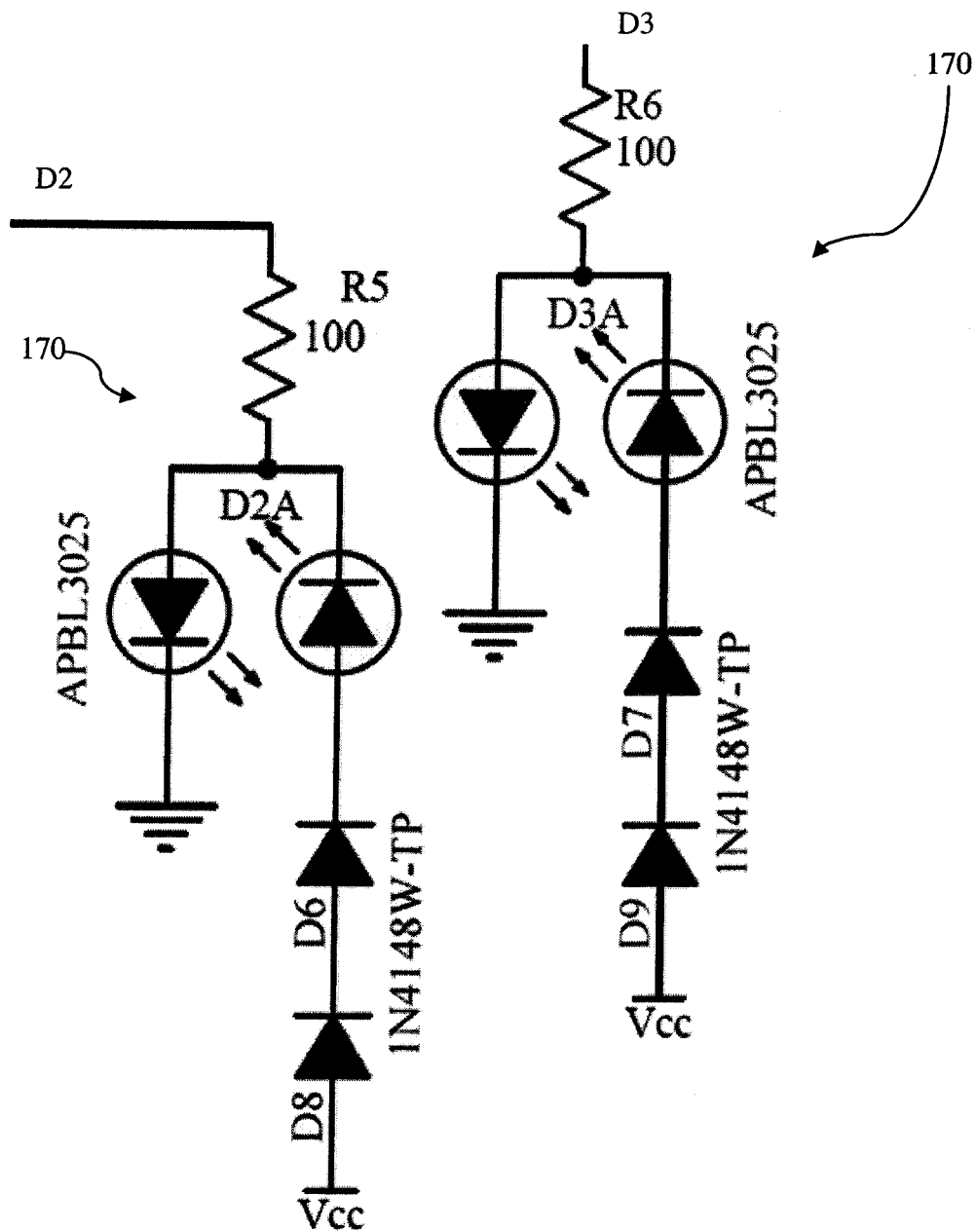

Referring to FIG. 4B, the controller circuitry 101 is depicted having a controller chip 105 in the form of chip PIC16F913-SSOP28. The controller circuitry 101 functions to control operation of the remote user transceiver 100. In order to supply programming instructions to the controller chip 105 programming input circuitry 108 is provided. Programming input circuitry 108 includes programming pins TP1-TP5. Programming pin TP1 is connected to pin 27 of the controller chip 105. Programming pin TP2 is connected with pin 28 of the controller chip 105. Pin TP3 in connected to voltage VCC provided by the power supply circuitry. Pin TP4 is connected to ground, and pin TP5 is connected to supply voltage VCC through resistor R1 and to pin 1 of the controller chip 105 to provide a master clear line MCLR. Pin 3 of the controller chip 105 is connected to indicator circuitry 175 provided in the form of an LED D1 to provide a low battery indicator light for purposes of indicating when the battery on the remote user transceiver 100 is low. The indicator LED D1 may also be used to indicate when the battery in the remote animal transceiver is low. Pin 6 of the controller chip 105 is connected with the signal field detector circuitry 190 so that a signal line TMRO provides an indication to controller chip 105 that a signal from a base antenna 47 is being detected to allow the controller chip 105 to replicate or store the activation signal being received from the base antenna 47 by the signal detection circuitry 190. Pin 7 of the controller chip 105 is connected with alarm circuitry 140 provided by an audio speaker LS1 connected to pin 7 through a switching transistor Q1. Pins 8 and 19 of the controller chip 105 have respective $V_{SS}$ lines connected to ground. Pin 20 of the controller chip 105 has its $V_{dd}$ line connected with the voltage supply VCC from the power supply circuitry. Pins 9 and 10 of the controller chip may optionally be connected to an external oscillator or may receive oscillator signals. Pins 21, 28, 27, 26 and 25 are connected respectively to user input switches as S2, S3, S4, S5 and S6 provided on the remote user transceiver 100 and as shown in further detail in the switching circuitry shown in FIG. 4C. Pin 16 supplies an indicator light output signal to Diode D2 and pin 22 supplies an output indicator signal D3 for the dog selection indicator light circuits 170 shown in FIG. 4D. Signal D2 supplied from the controller chip 105 functions to illuminate LED D2A for purposes of indicating operability for a first dog, and signal D3 functions to illuminate LED D3A for purposes of providing an indication of operability with a second dog. Pins 23 and 24 use signals RB2 and RB3 for the power supply circuitry.

Figure 4E:
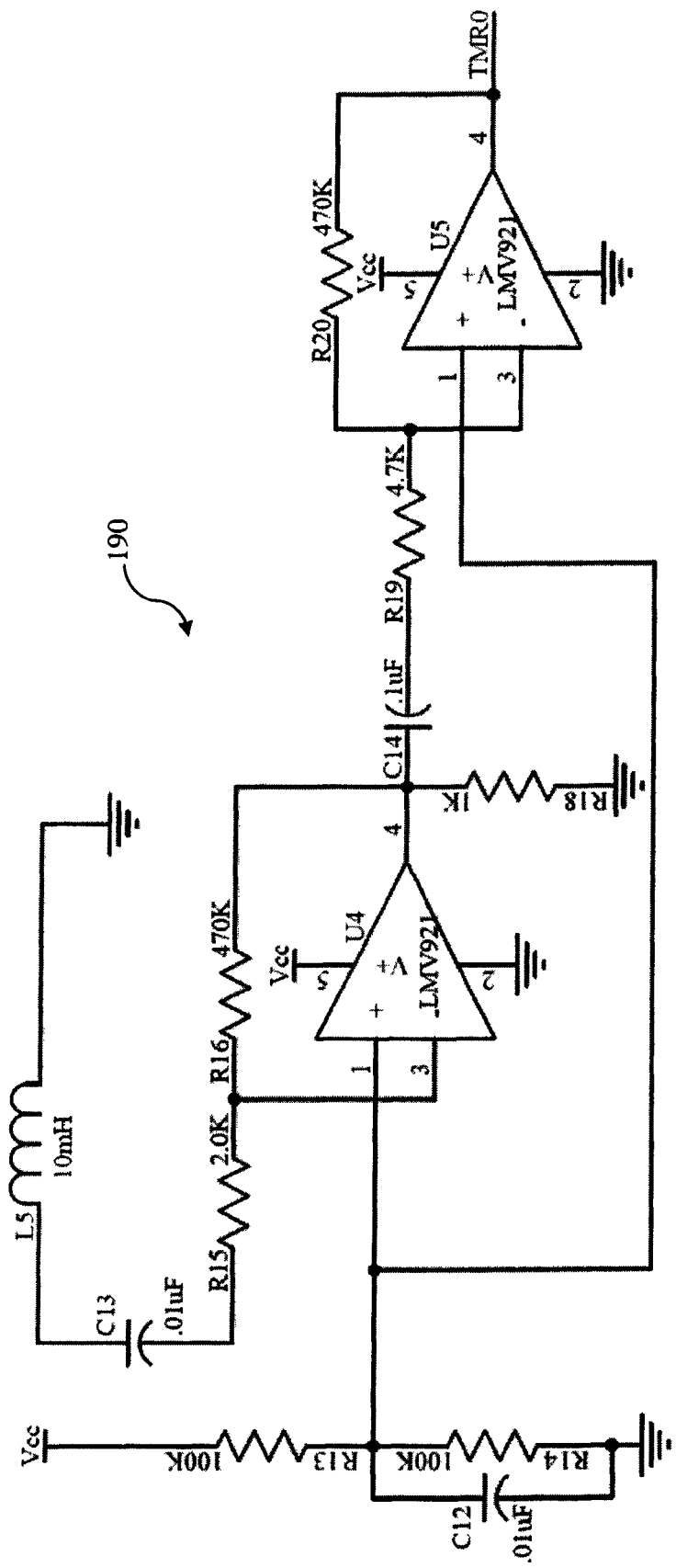
Figure 4F:
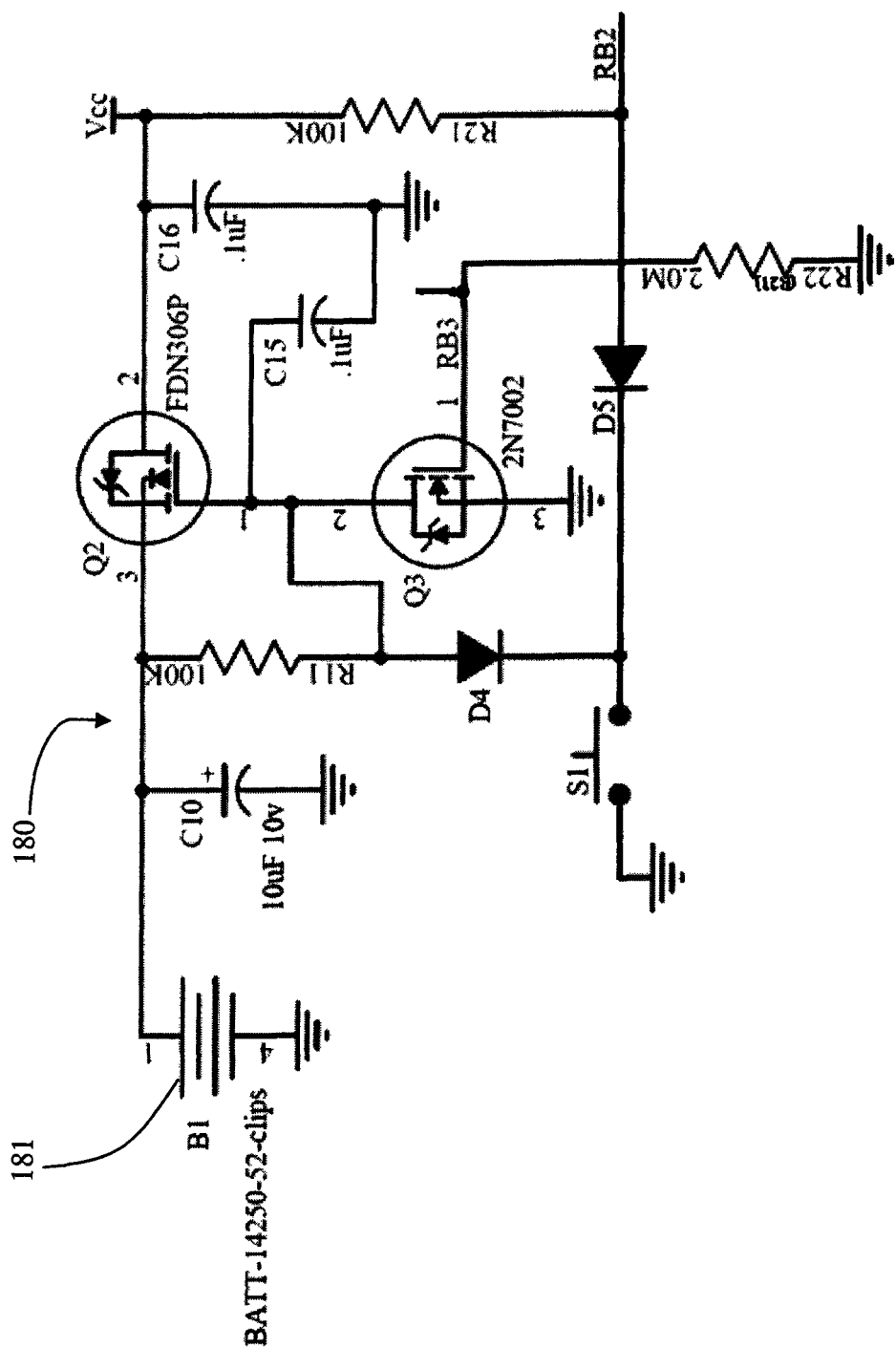

Referring to the power supply circuitry, generally designated 180, as shown in FIG. 4F, the power supply circuitry operates so that the voltage from battery B1, designated 181, is supplied to the voltage supply VCC when the unit is turned on and functions to disconnect the supply of voltage from battery B1 to VCC when the unit is turned off. When the unit is off, gate 1 of switching transistors Q2 is held high by open switch 51 so that switching transistor Q2 is off. To turn the unit on, switch S1 is depressed and held so that, gate 1 of switching transistors Q2 is turned low by the voltage drop across resistor R11 turning Q2 on to connect the battery B1 with voltage supply VCC. In response, processor chip 105 in turn sends signal RB3 to gate 1 of switching transistor Q3 so gate 1 of Q3 is brought high which turns Q3 on and latches the gate 1 of switching transistor Q2 low to latch transistor Q2 on so that Q2 will remain on when switch S1 is released. To turn the unit off, switch S1 is again depressed for a selected time so that such depression is sensed by the microcontroller. When switch S1 is depressed RB2 is brought low and tells the processor 105 to bring the RB3 line low which in turn causes the switching transistor Q3 to go off which in turn causes the gate 1 of switching transistor Q2 to go high when switch S1 is released and that in turn causes switching transistor Q2 to go off to thereby disconnect the battery B1 from the voltage supply line VCC.

Referring to FIG. 4E, the signal field detection circuitry 190 is depicted. The signal field detection circuitry 190 functions to detect an activation signal being generated from the base transmitter 45 over base antenna 47 to activate a stimulus control, such as an electrical shock, by the animal control transceiver 50 typically carried on an animal's collar. In order to detect the activation signal, the signal field detection circuitry 190 includes an antenna inductor L5 connected in series with capacitor C13 to form a series resonant circuit that functions to detect the electromagnetic field emitted from the base antenna 47 to activate the animal stimulus. The activation signal received from the base antenna 47 is fed through op amp U4 the output of which is in turn supplied through op amp U5 which supplies output signal TMR0 to the processor chip 105 which causes the chip to effect storage and/or replication of the activation signal for subsequent use by the remote user transceiver 100. By effecting the storage or saving in memory of an indicia of the signal or the actual signal itself, the requisite activation signal for creating the desired electronic stimulus to the animal such as an electrical shock, can be thereafter generated by the remote animal transceiver 200 in response, for example, to a control signal from the remote user transceiver 100, even when the remote animal transceiver 200 and/or the animal control transceiver 50 are not in the presence of the base transmitter 45 and base antenna 47.

Figure 5A:
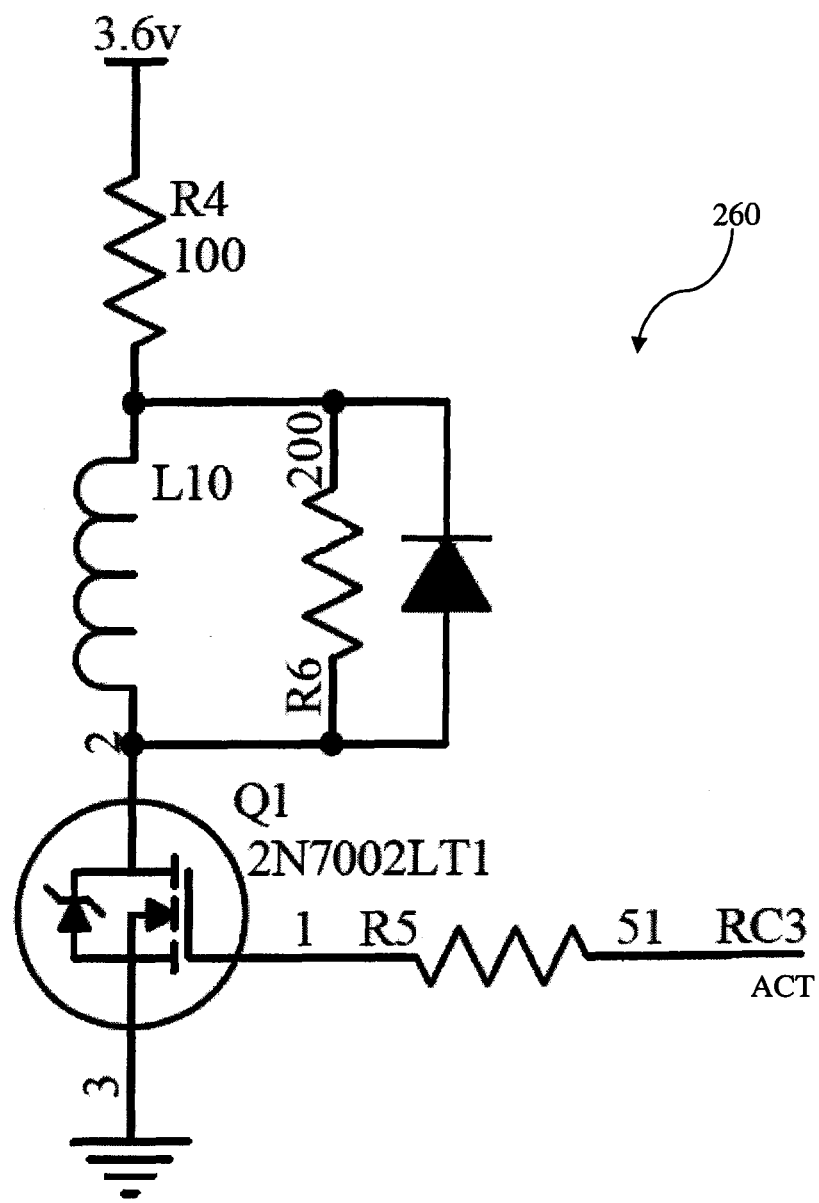
Figure 5B:
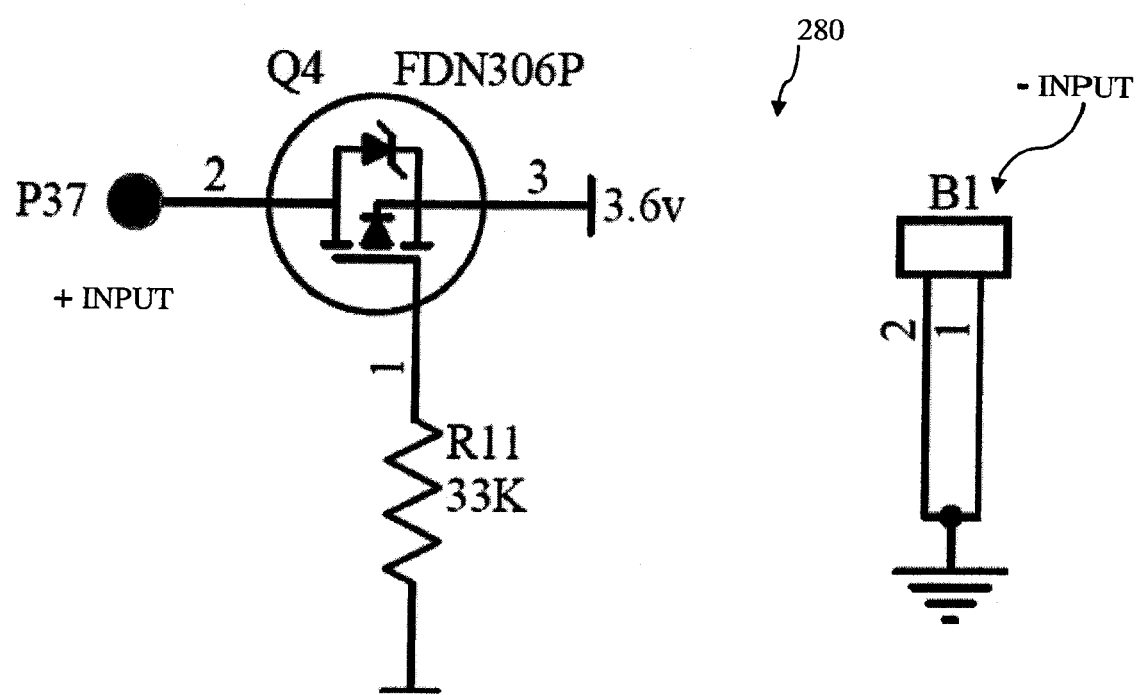
Figure 5C:
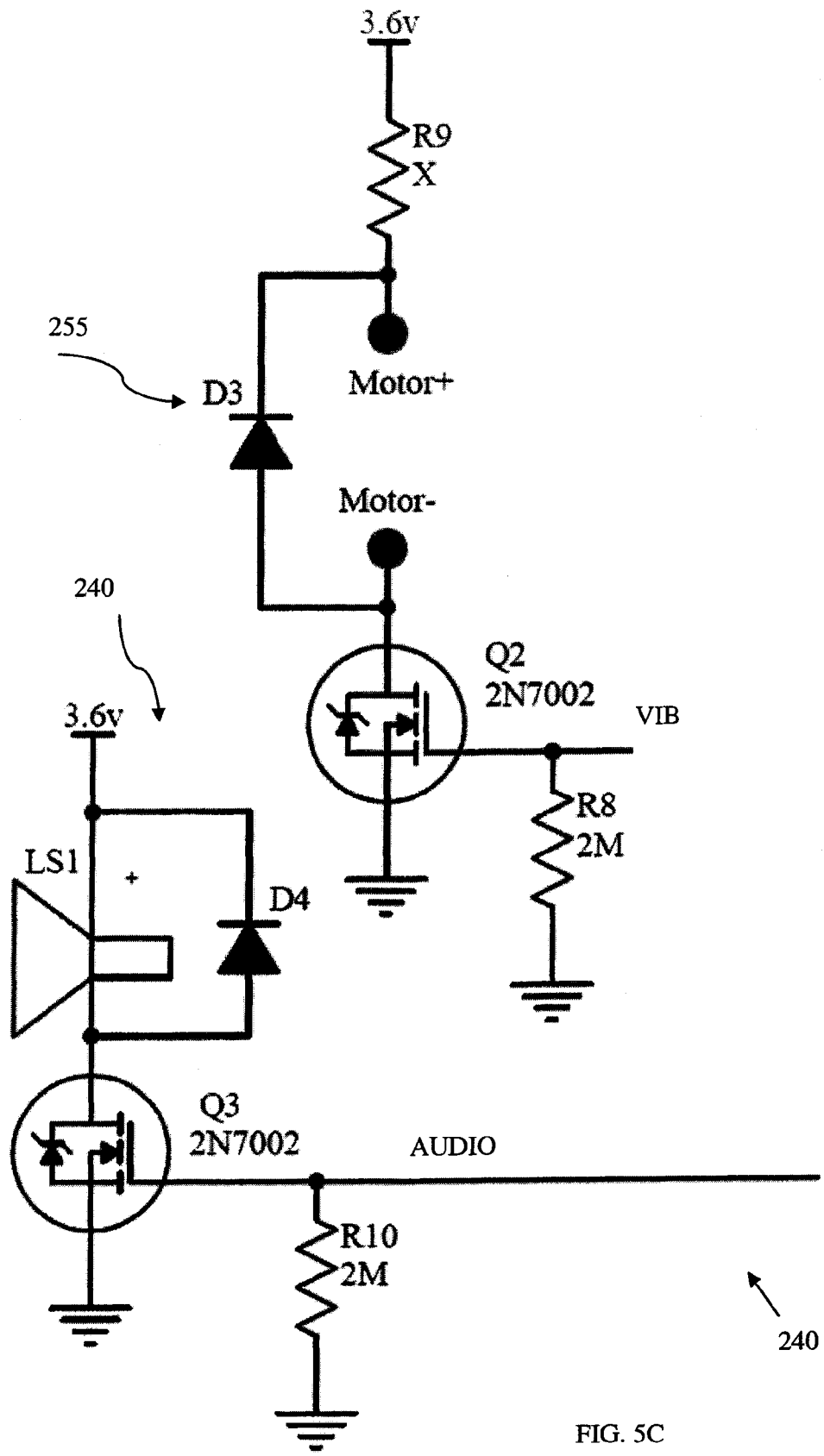
Figure 5D:
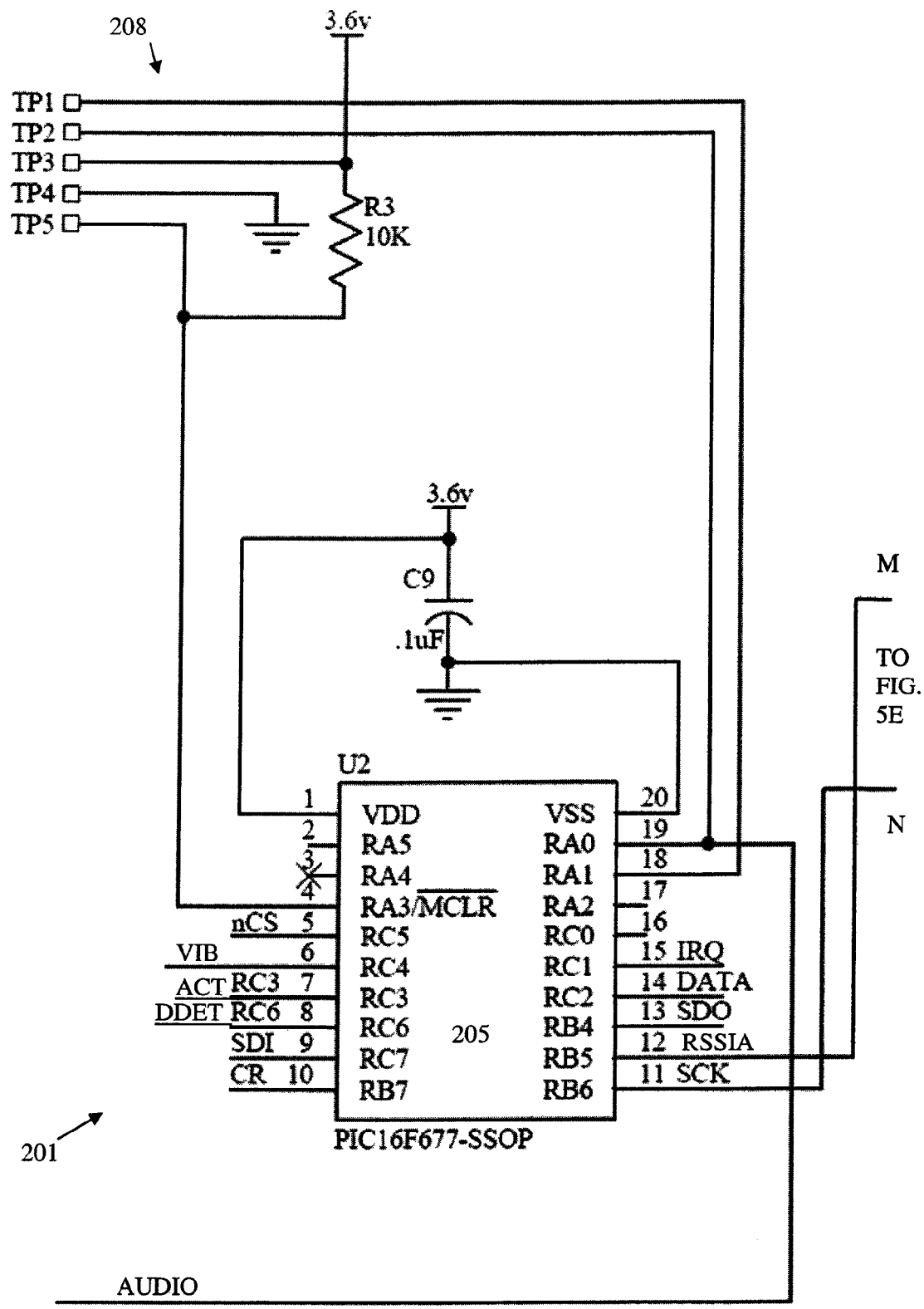
Figure 5E:
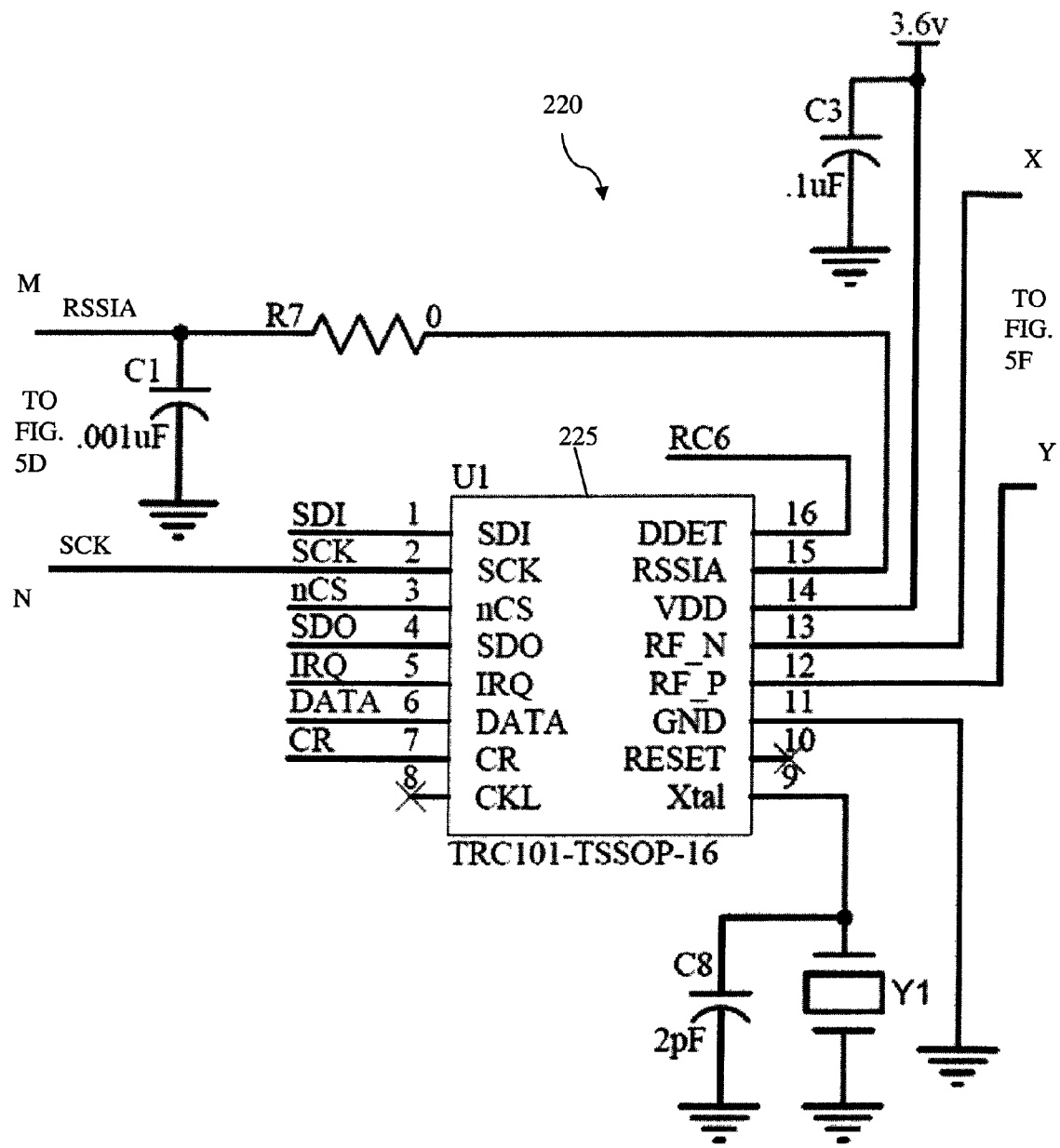

Referring to FIGS. 5A-5F, the circuitry for the remote animal transceiver 200 is shown in greater detail. Referring to FIGS. 5D and 5E, the remote animal transceiver 200 includes controller circuitry, generally designated 201, as shown in FIG. 5D and transceiver circuitry, generally shown as 220 in FIG. 5E. The controller circuitry 201 includes a controller chip 205 which functions to control operation of the remote animal transceiver 200. The controller chip 205 is provided as a microcontroller chip PIC16F677-SSOP shown as chip U2 on FIG. 5D. Similar to the operational connections between the controller chip 105 and the transceiver chip 121 of the remote user transceiver 100, the controller chip 205 is connected with the transceiver chip 225 provided in the form of transceiver chip TRC101-TSSOP-16 as shown as chip U1 in FIG. 5E. Pin 15 of the controller chip 205 is connected with pin 5 of the transceiver chip to provide an IRQ line. Pin 14 of the controller chip 205 is connected with pin 6 of the transceiver chip 225 to provide a DATA line. Pin 13 of the controller chip 205 is connected with pin 4 of the transceiver chip to provide a serial data output SDO line. Pin 12 of the controller chip 205 is connected with pin 15 of the transceiver chip to provide an RSSIA line. Pin 11 of the controller chip 205 is connected with pin 2 of the transceiver chip to provide a serial clock SCK line. Pin 5 of the controller circuit 205 is connected with pin 3 of the transceiver chip to provide a chip select line nCS. Pin 8 of the controller chip 205 is connected with pin 16 of the transceiver chip to provide a data detection line DDET. Pin 9 of the controller chip 205 is in connection with pin 1 of the transceiver chip to provide serial data input line SDI. Pin 10 of the controller chip 205 is connected with pin 7 of the transceiver chip to provide a control reset line CR. Pin 1 VDD of the controller chip 205 is connected to voltage supply 3.6 volts across capacitor C9 which is connected with Pin 20 VSS to ground. Pin 7 of the controller chip 205 is connected to the activation circuitry 260 shown in FIG. 5A. Pin 6 of the controller chip 205 is connected to the vibrational circuit at 255 as shown in FIG. 5C. Pin 19 of the controller chip 205 is connected to the audio circuitry 240 as shown in FIG. 5C.

Referring to FIG. 5D, in order to program the controller chip 205, programming input circuitry 208 is provided in the form of programming input pins TP1-TP5. Programming TP1 is connected with pin 18 of the controller chip 205. Programming pin TP2 is connected with pin 19 of the controller chip 205. TP3 Pin is connected to the voltage supply of 3.6 volts and to resistor R3. The other side of R3 is connected with programming pin TP5 which is in turn is connected to pin 4 of the controller. Programming pin TP4 is connected to ground.

Figure 5F:
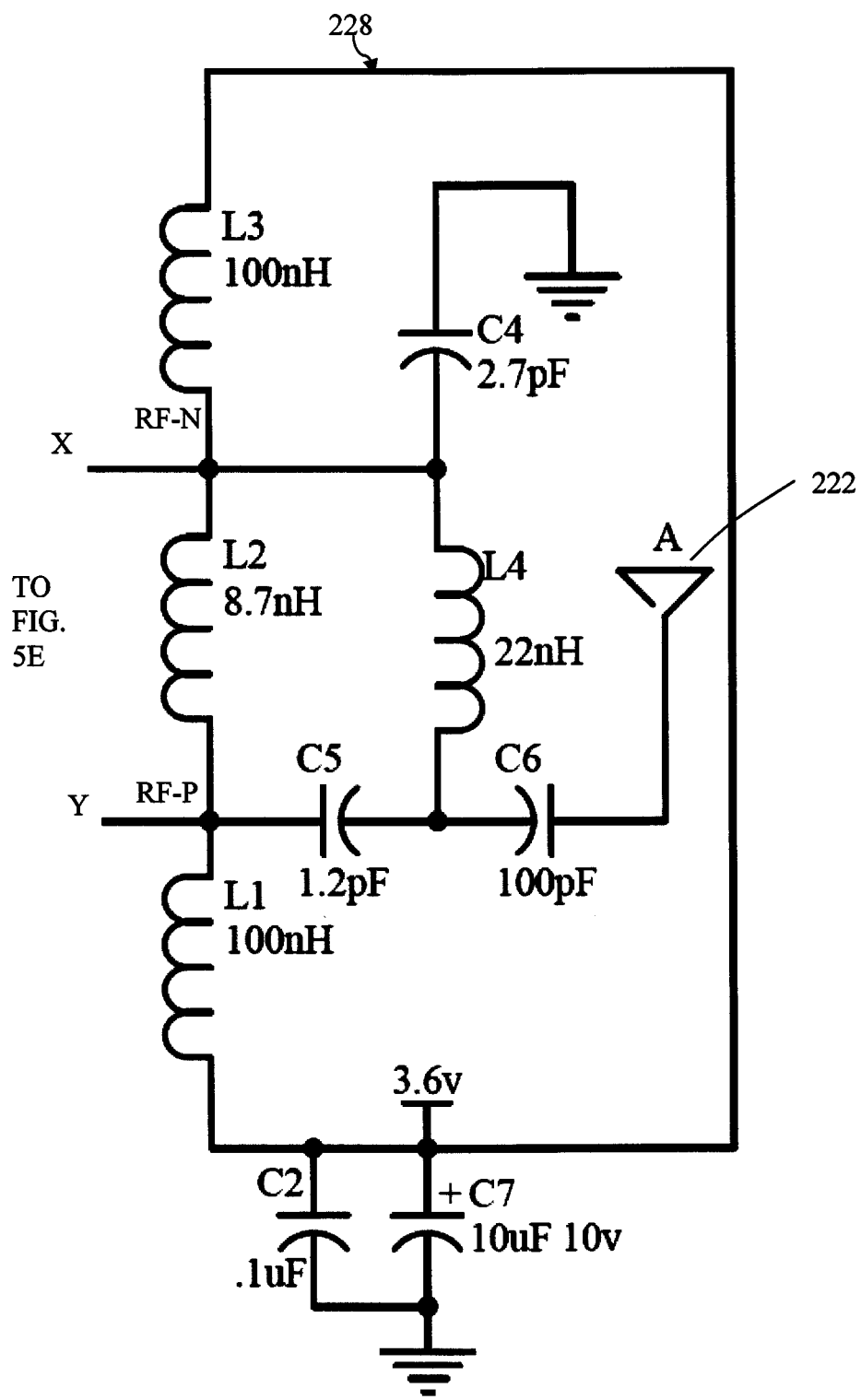

Referring to FIG. 5E, the transceiver circuitry 220 is depicted in greater detail. The transceiver circuitry 220 includes the transceiver chip 225 which functions to provide communication signals such as RF communication signals over antenna circuitry 228, as shown in FIG. 5F, that includes antenna A, designated 222. The transceiver circuitry 220 enables radio frequency communication signals to be transmitted between the remote animal transceiver 200 and the remote user transmitter 100. The transceiver chip 225 has pins 13 and 12 connected with the antenna circuitry 228 shown in FIG. 5F through impedance matching circuitry over lines RF_N and RF_P. Pin 14 of the transceiver chip 225 is connected to the voltage supply 3.6 volts at the VDD line and pin 11 of the transceiver chip 225 is connected to ground through the ground line GND. Pin 9 of the transceiver chip is connected with an oscillator provided by oscillator Y1 connected with pin 9 and in parallel with capacitor C8 to ground. The oscillator provides the oscillator signal Xta1 to pin 9 of the transceiver chip 225.

Referring to FIGS. 5C and 5D, pin 19 of the controller chip 205 is connected to the alarm circuitry 240 over the AUDIO line. The audio alarm circuitry 240 as shown in FIG. 5C includes a speaker LS1 connected to the controller chip 205 through switching transistor Q3. An audio enablement signal AUDIO over the audio line causes switching transistor Q3 to switch the speaker LS1 on to provide an audible signal.

Referring to FIGS. 5C and 5D, the controller chip 205 is also connected to the physical vibrational stimulus circuitry 255 through pin 6 over the VIB line which provides an output vibrational signal VIB to the vibrational circuitry 255 to cause a vibrational sensation to be delivered to the animal. For this purpose, the vibrational circuit 255 includes a vibrational motor connected with the controller chip 205 through switching transistor Q2. To activate the vibrational stimulus to the animal, the processor chip 205 outputs a vibration enablement signal VIB over the VIB line to turn the switching transistor Q2 on to cause the vibration motor to activate and generate a vibrational sensation to the animal. The processor chip 205 is also connected to the activation circuitry 260 as shown in FIG. 5A through pin 7 to effect an output activation signal from the remote animal transceiver 200 to the animal control transceiver 50. For this purpose an activation signal ACT can be supplied from the processor chip to switching transistor Q1 which functions to activate the activation loop provided by inductor L10 so that an activation signal can be supplied as a communication signal from the activation circuitry 260 to the animal control transceiver 50 in a recognizable format, such as replicated base control signal, that causes the animal control transceiver to activate a selected animal control stimulus, such as an electric shock, to the animal.

The remote animal transceiver 200 also includes power supply circuitry 280 as shown in FIG. 5B. Tab B1 is connected to the cathode of the battery while terminal P37 is connected to the anode of the battery to supply the 3.6 volt output. A switching transistor Q4 is connected between the anode input at P37 and the output supply voltage at 3.6 volt in order to isolate the battery from the circuitry of the device in the event that the battery is inadvertently connected backwards. The voltage output, 3.6 volts, supplied from the output of the power supply circuitry 280 is supplied to power the operational circuitry of the remote animal transceiver 200 and the RF transceiver circuitry of the remote animal transceiver 200.

Figure 6A:
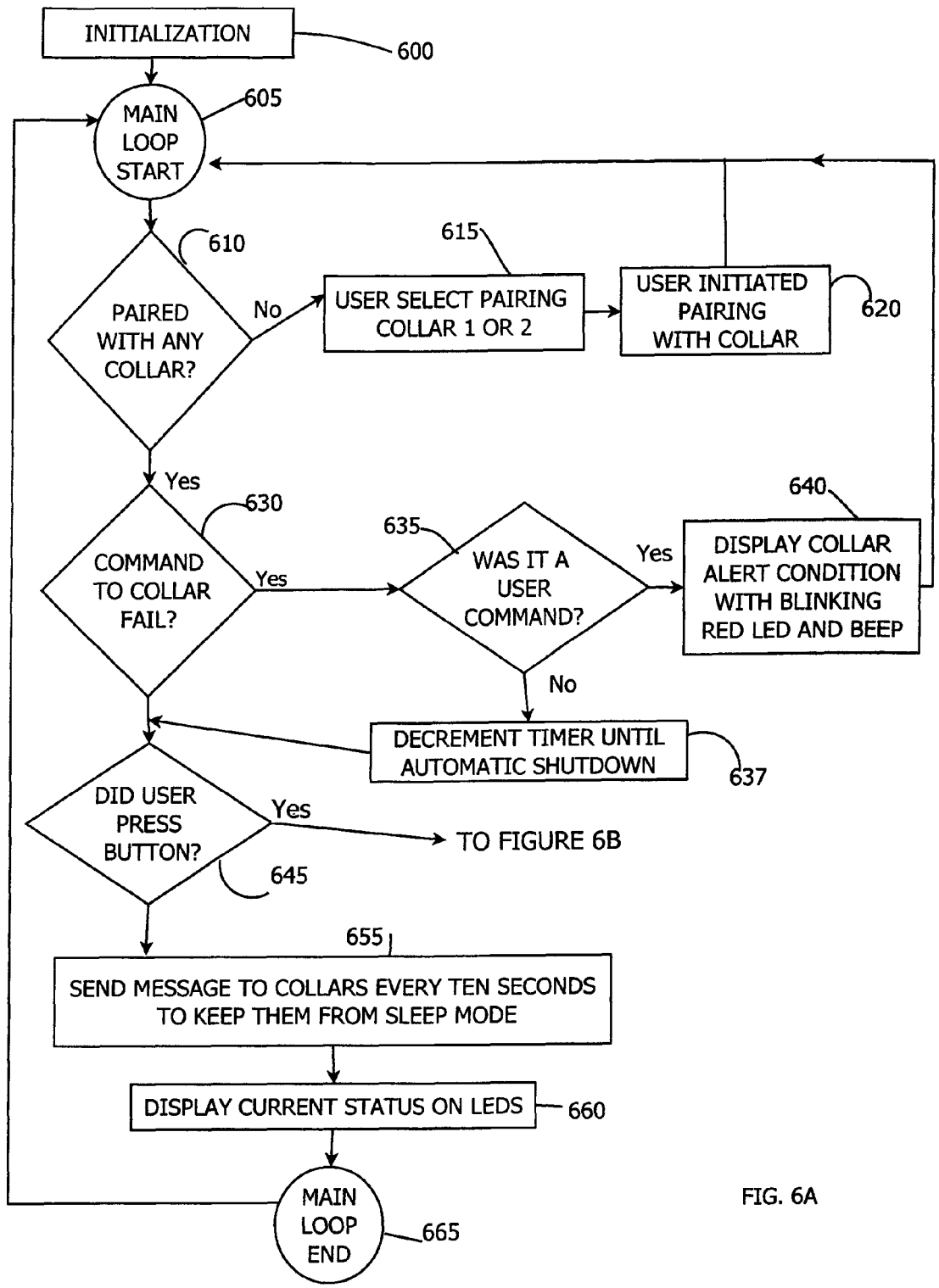
FIGS. 6A and 6B, is a flow chart depicting operation of the remote user transceiver.
Figure 6B:
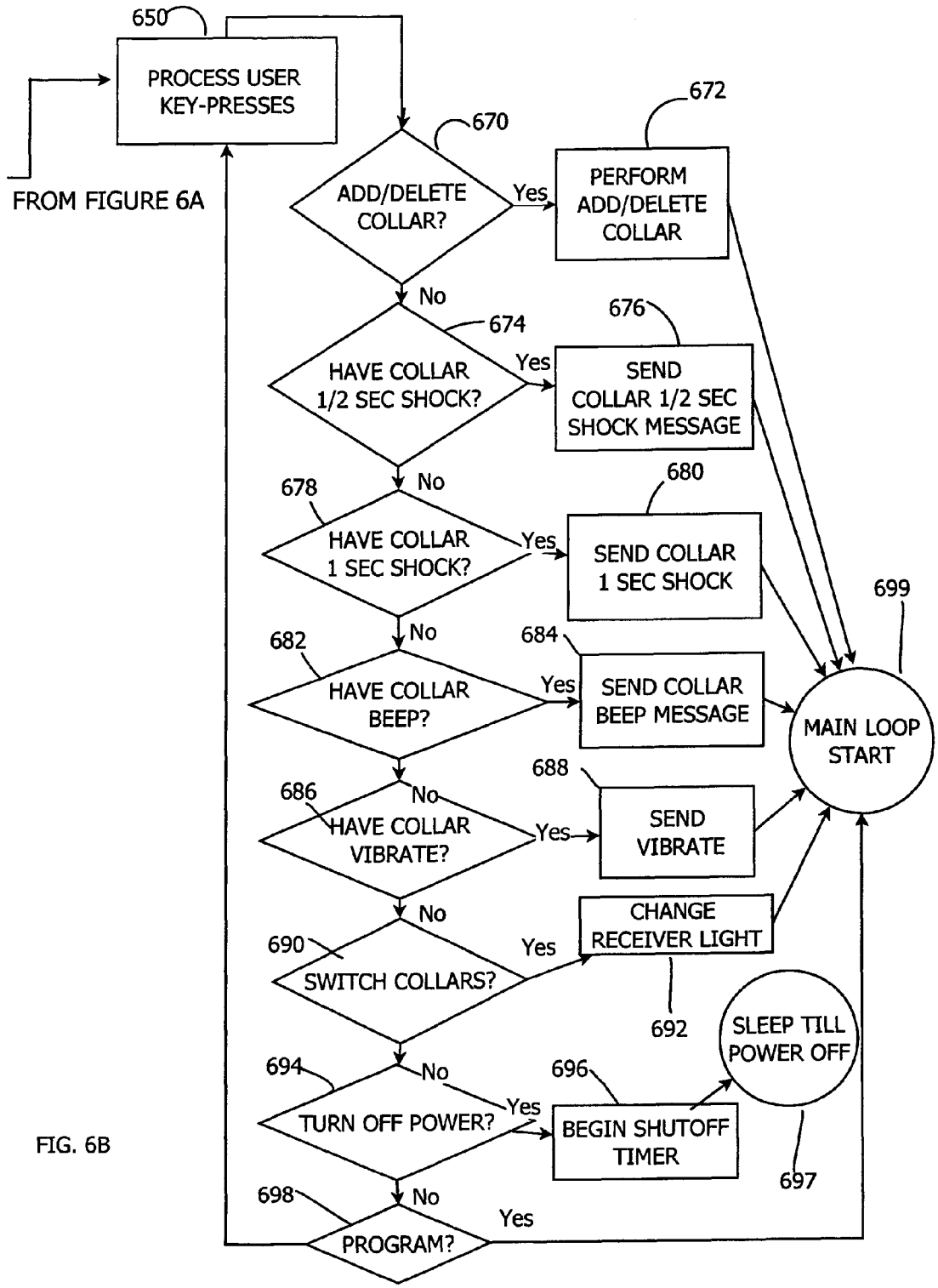

Referring to FIGS. 6A-6B, a flowchart is provided that illustrates operation of the handheld remote user transceiver 100. Upon pressing of the power button 310, the handheld remote 100 is initialized at step 600 to optionally retrieve previously saved states from a memory, such as an EEPROM. The previously saved states may include stored pairings between the handheld remote 100 and one or more remote animal transceivers 200. After the power-up initialization 600, the handheld remote 100 begins execution of the main loop 605. At step 610, a test is performed to determine if the handheld remote 100 is currently paired with a remote animal receiver 200. If the handheld remote 100 is not paired with any remote animal receiver 200, the handheld remote 100 alerts the user to the lack of any pairing, such as by a red flashing first remote receiver light D1. Since the handheld remote 100 may be paired with more than one remote animal receiver 200, as a first step in the pairing process, step 615, the handheld remote 100 waits for the user to select a remote animal receiver 200 for pairing. The user can press the receiver selection button S2 to select a first or second animal remote receiver 200 for pairing. Each press of the receiver selection button S2 toggles between the first and second remote receivers as indicated by the remote receiver lights D2 and D3.

After selection of a particular remote animal receiver 200, the user initiates pairing between the handheld remote 100 and the remote animal receiver 200 by pressing and holding the receiver selection button S2, at step 620. In response, the handheld remote 100 scans for the presence of the remote animal receiver 200 during which time the selected remote receiver light D2 or D3 may slowly flash red to indicate that pairing is in progress. If a remote animal receiver 200 is detected, pairing is effected between the handheld remote 100 and remote animal receiver 200, and the selected remote animal receiver light D2 or D3 turns solid green. To conserve battery power, the handheld remote 100 may scan for a limited period of time, e.g., 5 seconds. If the limited period of time expires without successful pairing, the handheld remote 100 stops scanning, and the user is alerted of the failure, for example, by continued red flashing of the selected remote receiver light D2 or D3. After either a successful or unsuccessful pairing, the handheld remote 100 returns to step 610, via step 605, where a test is again performed to determine if the handheld remote 100 has been paired with a remote animal receiver 200.

If the handheld remote 100 has been paired with a remote animal receiver 200, the handheld remote 100 advances to step 630, where it checks to determine if a command sent from the handheld remote 100 to the remote animal receiver 200 has failed. The command may be a user command initiated by the user by pressing keys S3, S4, S5 and S6 of the handheld remote 100 at step 650, as discussed below. Alternatively, the command may be an automated command generated by the handheld remote 100 itself at step 655, also discussed below. If the test 630 determines that a command to the remote receiver 200 has failed, the handheld remote 100 determines whether or not the command was from a user at step 635. If the system determines that the command was from a user, the handheld remote 100 displays an alert condition, for example, by emitting a beep and/or blinking one of the lights D1, D2 or D3 of the handheld remote 100, step 640. Once this alert has been provided to the user, the system returns to the main loop, at step 605. If, however, the system determines that the failed command was automatically generated by the handheld remote 300, the handheld remote 100 tests to see if the automatically generated commands continue to fail for a specified period, such as two minutes, at step 637. If the command failure continues for the specified period for all paired remote animal receivers 200, the handheld remote 100 is powered down to conserve battery power.

If no command failures are detected at step 630, or the command failures are resolved prior to expiration of the specified time period at step 637, the handheld remote 100 proceeds to detect if the user has pressed a button, step 645. If the user has not pressed a button, the handheld remote 100 sends a message (a "ping") to the paired remote animal receivers 200 at a preset time interval, e.g., 10 seconds, to prevent the paired remote receivers 200 from entering the sleep mode. Upon receipt of an acknowledgment signal from the paired remote receivers 200, the handheld remote 100 updates the first and second remote receiver lights D2 and D2 to indicate the communication state with the remote animal receivers 200, step 660, after which the handheld remote 100 returns to the main loop, at step 605.

Returning to step 645, if the user did press a button, the handheld remote 100 advances to process the key-press, at step 650, FIG. 6B. The handheld remote 100 compares the input of the key-press to a number of known inputs to determine the proper course of action. Starting at step 670, and through each of the steps numbered up to step 698, the handheld remote 100 successively checks to determine which action the user has initiated by the key-press.

At step 670, the handheld remote 100 checks to determine whether or not the user has pressed and held the receiver selection button S2 to add or delete a remote animal receiver 200. If this is the case, the handheld remote 100 advances to step 672 and performs the add/delete remote animal receiver function, followed by advancing to the main loop 605 at step 699. If the user was not attempting to add or delete a remote animal receiver 200, the handheld remote 100 advances to step 674, where it determines if the user is initiating a ½ second shock by pressing the ½ second shock button S5.

If the user is initiating a ½ second shock, the handheld remote 100 sends a message to the remote receiver 200 to instruct the remote animal receiver 200 to send a signal to the animal control transceiver in the form of a shock collar to perform a ½ second shock, at step 676, after which the handheld remote 100 advances to the main loop 605 at step 699. If the user was not initiating a ½ second shock, the handheld remote 100 advances to step 678, where it determines if the user is initiating a 1 second shock by pressing the 1 second shock button S6.

If the user is initiating a 1 second shock, the handheld remote 100 sends a message to the remote animal receiver 200 to instruct the remote animal receiver 200 to send a signal to the shock collar 50 to perform a 1 second shock, at step 680, after which the handheld remote 100 advances to the main loop 605 at step 699. If the user was not initiating a 1 second shock, the handheld remote 100 advances to step 682, where it determines if the user is initiating a beep on the remote animal receiver 200 by pressing the beep button S3.

If the user is initiating a beep on the remote animal receiver 200, the handheld remote 100 sends a message to the remote animal receiver 200 to instruct the remote animal receiver 200 to beep, at step 684, after which the handheld remote 100 advances to the main loop 605 at step 699. If the user was not initiating a beep on the remote animal receiver 200, the handheld remote 100 advances to step 686, where it determines if the user is instructing the remote animal receiver 200 to vibrate by pressing the vibrate button S4.

If the user is instructing the remote animal receiver 200 to vibrate, the handheld remote 100 sends a message to the remote animal receiver 200 to instruct the remote animal receiver 200 to vibrate, at step 688, after which the handheld remote 100 advances to the main loop 605 at step 699. If the user was not instructing the remote animal receiver 200 to vibrate, the handheld remote 100 advances to step 690, where it determines if the user is switching between remote receivers by pressing the receiver selection button S2.

If the user is switching between remote animal receivers, the handheld remote 100 updates the status of the first and second remote animal receiver lights D2 and D3 to reflect the new selection, at step 692, after which the handheld remote 100 advances to the main loop 605 at step 699. If the user was not switching between remote animal receivers, the handheld remote 100 advances to step 694, where it determines if the user is powering-off the handheld remote 100 by pressing the power button S1.

If the user is powering-off the handheld remote 100, the handheld remote 100 initiates a shutdown timer to sleep until power off, at steps 696, 697. If the user was not powering-off the handheld remote 100, the handheld remote 100 advances to step 698, where it determines if the user is initiating the programming mode by, for example, pressing the receiver selection button S2 simultaneously with either the beep button S3 or vibrate button S4. If the user is initiating the programming mode, programming proceeds with reference to FIG. 8A.

Figure 8A:
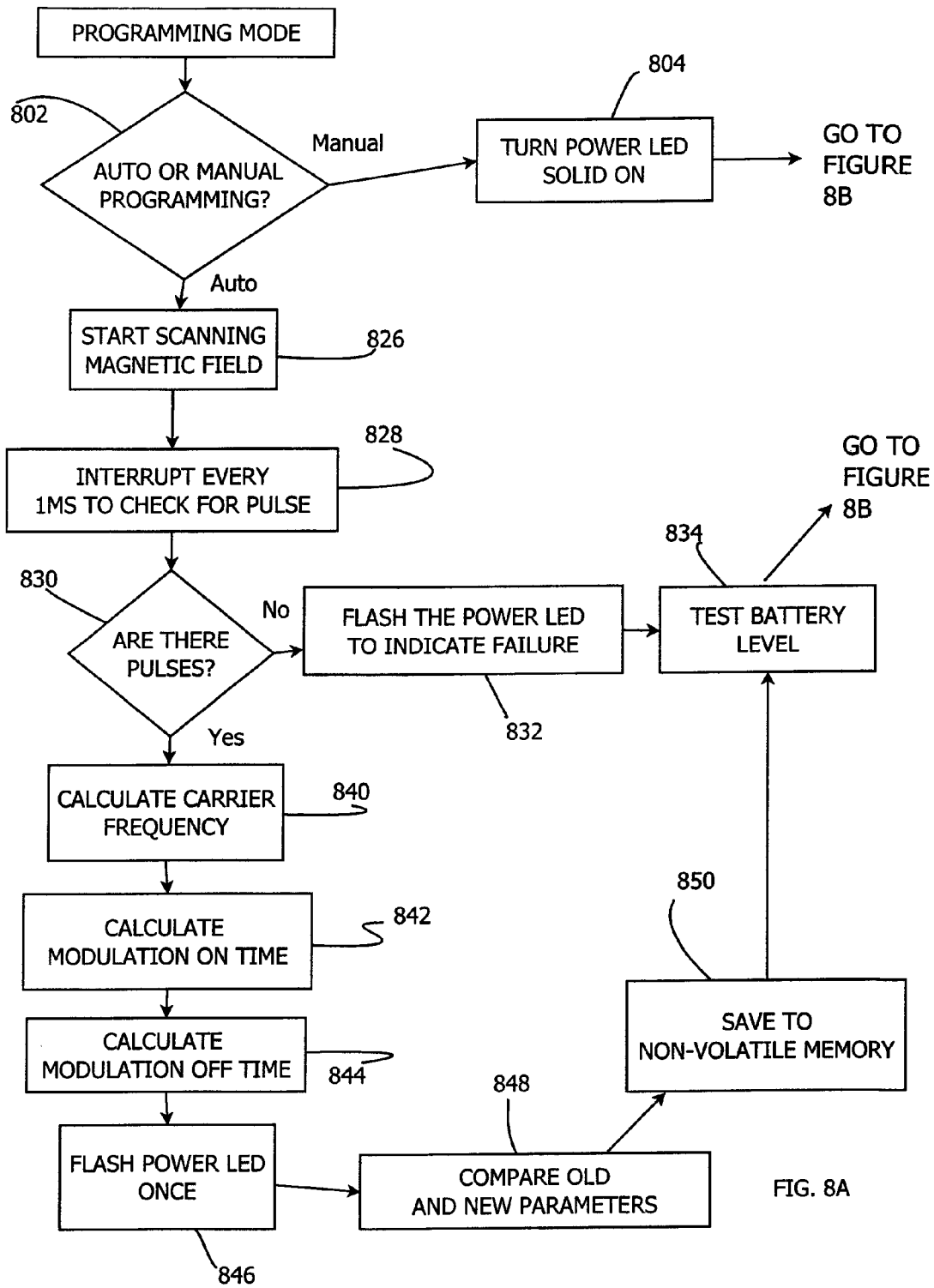
FIGS. 8A and 8B, is a flow chart representing programming of the remote user transceiver.
Figure 8B:
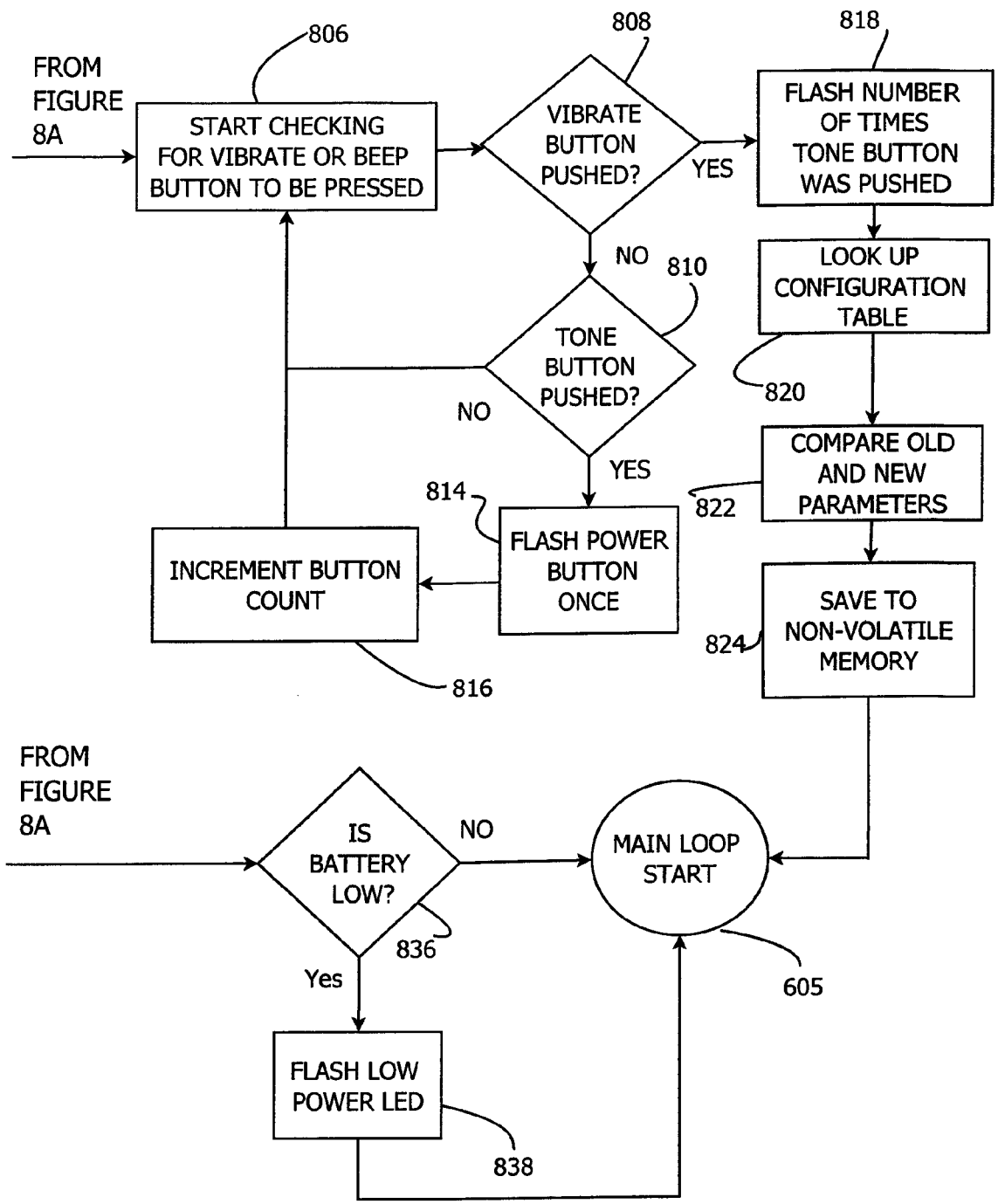

Turning then to FIG. 8A, at the outset of the programming procedure, a decision is made to determine whether the user is initiating automatic programming (e.g., by simultaneously pressing the receiver selection button S2 and beep button S3) or manual programming (e.g., by simultaneously pressing the receiver button S2 and vibrate button S4), at step 802. If manual programming is being initiated, indication of the manual programming mode may be provided to the user by turning on the power-on light D1, at step 804. During manual programming the handheld remote 100 begins to check if the vibrate button S4 or beep button S3 has been pressed, at step 806, FIG. 8B. If the vibrate button S4 has not been pushed, at step 808, the handheld remote 100 tests to determine if the beep button S3 has been pressed, at step 810. If the beep button S3 has not been pressed, the handheld remote 100 resumes processing at step 806. If the beep button S3 has been pressed, the power-on light D1 flashes once and a button count is incremented, at steps 814 and 816. After incrementing the button count, processing continues at step 806. In practice, the user presses the beep button S3 a selected number of times. The number of times the beep button S3 is pressed identifies the brand and make of the installed antenna. Once the user has pressed the beep button S3 the desired number of times, the user can press the vibrate button S4 to indicate that the process of pushing the beep button S3 is completed. The handheld remote 100 identifies that the user has pressed the vibrate button S4 at step 808, and, in response, flashes the power-on light D1 the number of times the beep button S3 was pushed so the user can verify that the handheld remote 100 counted the intended number beep button presses, step 818. Using the button count the handheld remote 300 looks up the configuration parameters from a configuration table, step 820. The configuration parameters from the look-up table are compared to those already in memory, step 822. If the values are different the parameters from the configuration table are stored in non-volatile memory, step 824, after which the handheld remote 100 returns to the start of the main loop at step 605, FIG. 6A.

Returning to step 802 and FIG. 8A, if automatic programming has been selected by the user, the handheld remote 100 begins scanning for an RF signal of an installed base antenna 47, during which time the user takes the handheld remote 100 into the yard and stands over or near the antenna 47, at step 826. The handheld remote 100 checks for the RF signal emitted from the antenna at regular time intervals, such as 1 ms, at step 828. If no pulses are detected, at step 830, the power-on light D1 flashes to indicate failure, at step 832. If, however pulses are detected, the handheld remote 100 calculates the carrier frequency, modulation on-time, and modulation off-time of the pulses emitted by the antenna 47, at steps 840-844. After the calculations are completed the power-on light D1 flashes once to indicate that the antenna signal has been detected and processed, at step 846. The calculated values are compared to those already in memory, at step 848. If the calculated values are different from those stored in non-volatile memory, then the calculated values are stored to non-volatile memory, at step 850. After the calculated values are stored, at step 850, or after step 832, the battery level of the handheld remote 100 is checked, at step 834. If the battery level is low, at step 836, FIG. 8B, the power-on light D1 flashes red to indicate the low battery condition, at step 838. After flashing the power-on light D1, at step 838, or if the battery level is not low, the handheld remote returns to the start of the main loop at step 605, FIG. 6A.

Figure 7A:
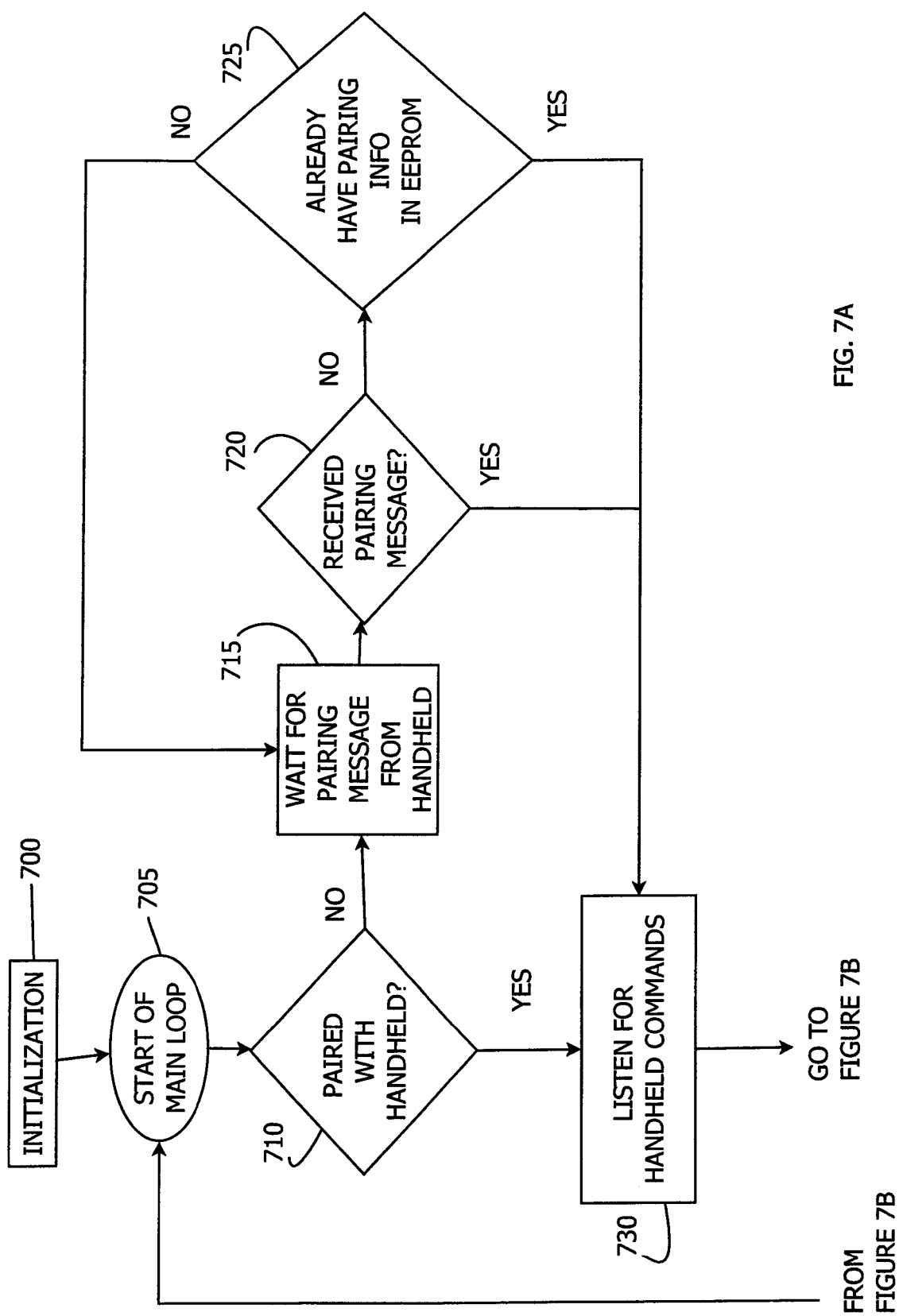
FIGS. 7A and 7B, is a flow chart depicting operation of the remote animal transceiver.

Turning to the remote animal receiver function, a flowchart is illustrated diagramming the operations of the remote animal receiver 200 in FIG. 7A. Once the remote animal receiver 200 has powered up, the remote receiver 200 initializes at step 700. The process of initialization may include retrieving saved settings or pairings from EEPROM or other desired startup procedures. Once complete, the remote animal receiver 200 initiates the main loop at step 705. The remote animal receiver 200 first determines if it is paired with the handheld remote 100, at step 710. If the remote animal receiver 200 is not currently paired, it will move to step 715 and wait for a pairing message from the handheld remote 100. If the remote animal receiver 200 does not receive a pairing message from the handheld remote 300, the remote receiver 200 will again check its memory to determine if the remote animal receiver 200 already has pairing information, at step 725. If the remote receiver 200 does not have pairing information already in EEPROM, the remote receiver 200 will restart the waiting process at step 715.

Figure 7B:
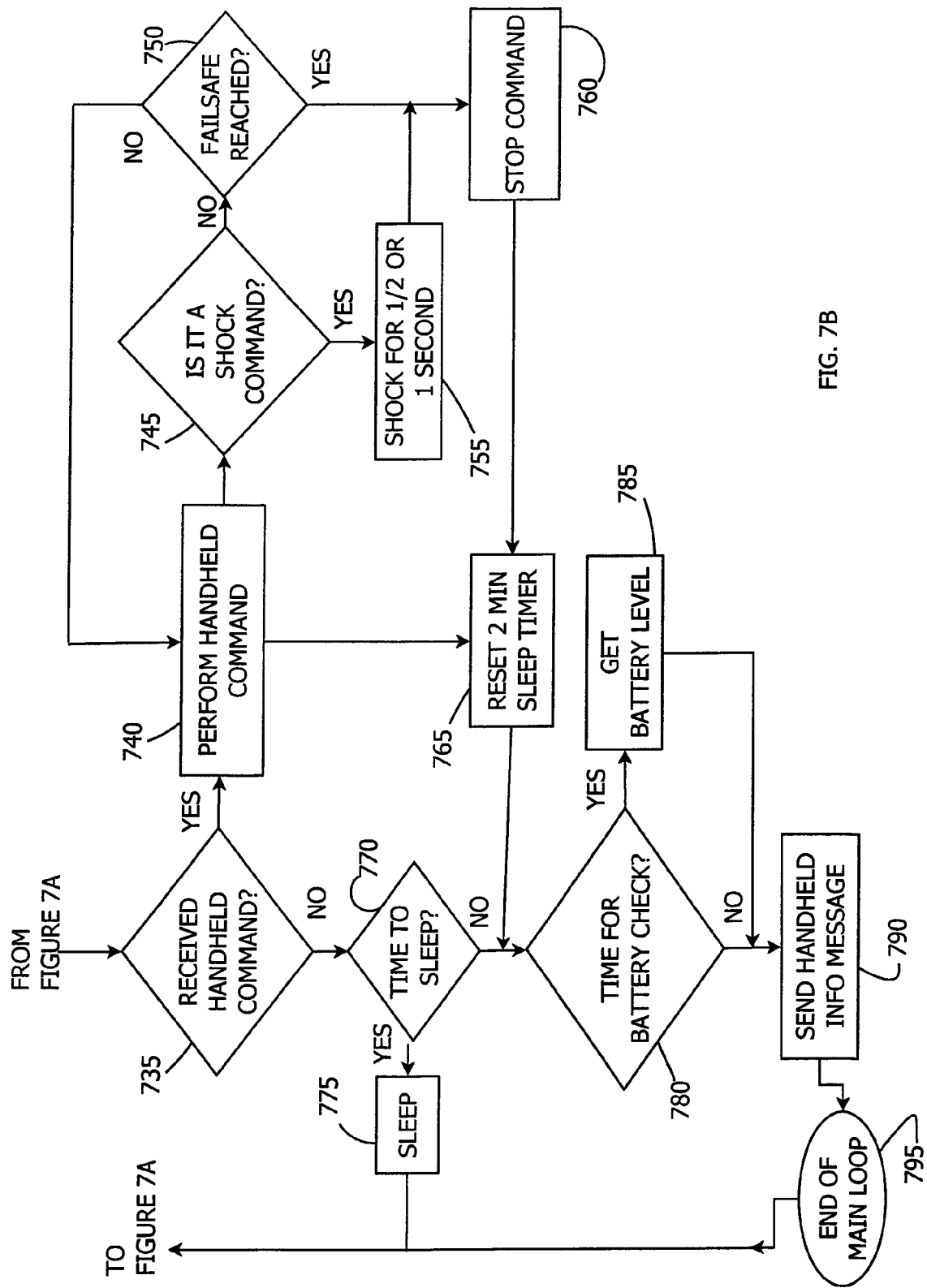

If the remote animal receiver 200 does receive a pairing message at step 720, or if the remote animal receiver 200 determines that it already has pairing information stored in memory at step 725, the remote animal receiver 200 waits for a handheld command, at step 730. While the remote animal receiver 200 is waiting for command, a sleep timer is initiated to specify a maximum time the remote receiver 200 will wait for a command before entering a sleep state. The sleep timer is tested at step 770, and if the maximum time has been exceeded the remote receiver 200 goes to sleep, at step 275, FIG. 7B.

Alternatively, if the remote receiver 200 receives a command at step 735, the remote animal receiver 200 initiates the process of performing the received command at step 740.

The commands that the remote receiver 200 can interpret may include a positive or negative reinforcement of behavior, in the form of an electrical shock, a vibration, or a beep, for example. In the event that the command is one which does not have a specified time associated with it, such as a vibration or a beep, the command is initiated at step 740 and continues for as long as the user presses the corresponding button on the handheld remote 100, e.g., the beep button S3 or the vibrate button S4. If the command is not a shock command, step 745, the duration of the command (i.e., the duration the beep button S3 or vibrate button S4 are held down) is tested at step 750 to provide a failsafe. If the duration of the command is longer than a preset value, execution of the command is stopped even if the user continues to press the beep button S3 or the vibrate button S4, at step 760. On the other hand, if the command is a shock command, the remote receiver 400 sends a signal to the shock collar 50 instructing the shock collar 50 to provide a ½ second or 1 second shock, step 755, after which the remote animal receiver 200 proceeds to the stop command, at step 760. After the stop command, step 760, the sleep timer is reset, at step 765.

Periodically, the battery level is tested. A check is made at step 780 to determine if it is time for a battery check. If it is time for a battery check, the battery level is checked at step 785. If the battery is low, the low battery condition may be singled by blinking of the power-on light D1 on the handheld remote 100. After the battery check, or if it is not yet time for a battery check, the remote animal receiver 200 sends an information message to the handheld remote 100 which may contain the battery level, a command, remote receiver ID information, and ping acknowledgment, at step 790. After sending of the message by the remote animal receiver 200, the instruction loop ends at step 795 and returns to the start of the main loop at step 705.

What is claimed is:

1. An animal training system comprising: a base transmitter for transmitting a base control signal;
   an animal control receiver for placement at a first location at the animal for receiving the base control signal transmitted from the base transmitter and for providing a control stimulus to the animal;
   a portable user remote transceiver for a user for transmitting a remote control signal; a remote animal transceiver for placement at a second location at the animal separate from the animal control receiver for receiving the remote control signal and for effecting a control stimulus to the animal, and wherein the remote animal transceiver at the animal is configured so that in response to a selected remote control signal the remote animal transceiver provides a control stimulus to the animal and in response to another remote control signal the remote animal transceiver communicates a communication signal to the animal control receiver so that the animal control receiver provides a control stimulus to the animal, and
   wherein the remote animal transceiver at the animal is configured to selectively provide a control directly to the animal and selectively communicate with the animal control receiver at the animal so that the animal control receiver provides a control stimulus to the animal.

2. The animal training control system of claim 1 wherein the remote animal transceiver is configured so that in response to a selected remote control signal from the user remote transmitter the remote animal transceiver communicates a communication signal to the animal control transceiver so that the animal control receiver provides an animal control stimulus to the animal, including an electrical shock.

3. The animal training control system of claim 1 wherein the remote animal transceiver effects the control stimulus to the animal by providing a control stimulus to the animal, including a vibrational stimulus.

4. The animal training system of claim 1 wherein the remote animal transceiver in response to a remote control signal may effect a control stimulus to the animal by providing at least one or both of (a) a controlled stimulus to the animal from the remote animal transceiver and (b) a communication signal to the animal control transceiver so that the animal control transceiver provides a control stimulus to the animal.

5. The animal training system of claim 1 wherein the control stimulus to the animal may include at least a first controlled stimulus provided by the remote animal transceiver in response to a remote control signal from the portable user remote transmitter and at least a second controlled stimulus provided by the animal control receiver in response to a communication from the remote animal transceiver in response to a different remote control signal from the portable user remote transmitter.

6. The animal training system of claim 5 wherein the first control stimulus includes at least one or both of (a) an audible alarm and (b) a physical vibration to the animal produced by the remote animal transceiver.

7. The animal training system of claim 5 wherein the second control stimulus includes at least one or both of (a) an audible alarm and (b) an electrical shock produced by the animal control receiver.

8. The animal training system of claim 1 wherein the animal control receiver is responsive to the base control signal transmitted from the base transmitter to produce an animal control stimulus to the animal and wherein the portable user remote transceiver includes a receiver and signal detection circuitry for detecting the base control signal transmitted from the base transceiver, and wherein the remote animal transceiver includes activation circuitry for reproducing the base control signal that was detected by the portable user remote transmitter for transmission to the animal control transceiver in response to a remote control signal from the portable user remote transceiver so that the animal control receiver produces an animal control stimulus to the animal.

* * * * *